United States Patent
Roy et al.

(10) Patent No.: US 10,129,346 B1
(45) Date of Patent: Nov. 13, 2018

(54) ANALYZING NAVIGATION WITH A WEBPAGE

(75) Inventors: Ashutosh Roy, Los Altos, CA (US); Promod Narang, Los Altos, CA (US); Jeffrey Huang, Foster City, CA (US); Sam Hahn, Saratoga, CA (US)

(73) Assignee: eGain Corporation, Sunnyvale, CA (US)

( * ) Notice: Subject to any disclaimer, the term of this patent is extended or adjusted under 35 U.S.C. 154(b) by 745 days.

(21) Appl. No.: 13/004,794

(22) Filed: Jan. 11, 2011
(Under 37 CFR 1.47)

Related U.S. Application Data

(63) Continuation-in-part of application No. 12/210,463, filed on Sep. 15, 2008, now Pat. No. 9,123,019.

(60) Provisional application No. 61/039,370, filed on Mar. 25, 2008, provisional application No. 61/294,032, filed on Jan. 11, 2010.

(51) Int. Cl.
*G06F 15/16* (2006.01)
*H04L 29/08* (2006.01)

(52) U.S. Cl.
CPC .................. *H04L 67/22* (2013.01)

(58) Field of Classification Search
CPC .... H04L 67/36; H04L 67/22; H04L 29/08657
USPC ................. 709/205, 201, 202, 204
See application file for complete search history.

(56) References Cited

U.S. PATENT DOCUMENTS

| | | | |
|---|---|---|---|
| 6,295,551 B1 | 9/2001 | Roberts et al. | |
| 6,310,607 B1 * | 10/2001 | Amemiya ................. | G06F 1/32 345/159 |
| 7,003,565 B2 * | 2/2006 | Hind ....................... | G06Q 30/02 709/203 |
| 8,051,172 B2 | 11/2011 | Sampson | |
| 8,051,178 B2 | 11/2011 | Skidgel | |
| 8,356,074 B1 * | 1/2013 | Ehrlich ................. | H04L 67/322 709/203 |
| 8,527,869 B2 * | 9/2013 | Hosea ............... | G06F 17/30905 707/732 |
| 8,682,977 B1 | 3/2014 | Roy et al. | |
| 9,123,019 B1 | 9/2015 | Roy et al. | |
| 9,317,615 B2 | 4/2016 | Burckart et al. | |
| 9,330,188 B1 | 5/2016 | Hayden et al. | |
| 2002/0049812 A1 | 4/2002 | Nahon | |
| 2002/0073155 A1 | 6/2002 | Anupam et al. | |
| 2002/0143878 A1 * | 10/2002 | Birnbaum ......... | G06F 17/30899 709/205 |
| 2003/0097448 A1 | 5/2003 | Menezes et al. | |
| 2003/0208603 A1 * | 11/2003 | Manor et al. ................. | 709/227 |
| 2005/0240558 A1 | 10/2005 | Gil et al. | |
| 2006/0122895 A1 | 6/2006 | Abraham et al. | |
| 2006/0248442 A1 * | 11/2006 | Rosenstein ............. | G06F 17/24 715/205 |
| 2007/0002027 A1 * | 1/2007 | Lii .......................... | G06F 3/038 345/173 |
| 2008/0104618 A1 * | 5/2008 | Rogers et al. ................. | 719/328 |

(Continued)

*Primary Examiner* — Davoud A Zand

(57) ABSTRACT

A method, computer-readable medium and system for analyzing navigation of a webpage are disclosed. Data associated with navigation of a webpage is monitored using a component running on a computer system which also runs a web browser used to display the web page. The data may include the position of a mouse cursor displayed on a display device and/or a state of a form field of the webpage. In this manner, information about user interactions with a webpage which do not involve or initiate a communication with a web server can be accessed.

18 Claims, 30 Drawing Sheets

(56) References Cited

U.S. PATENT DOCUMENTS

| | | | |
|---|---|---|---|
| 2008/0183558 A1* | 7/2008 | Koran | 705/10 |
| 2008/0201206 A1* | 8/2008 | Pokorney | G06F 17/30867 705/7.29 |
| 2008/0228910 A1* | 9/2008 | Petri | G06F 17/30905 709/224 |
| 2009/0100154 A1* | 4/2009 | Stevenson | G06Q 30/02 709/220 |
| 2009/0158166 A1* | 6/2009 | Dewar et al. | 715/745 |
| 2009/0164581 A1 | 6/2009 | Bove et al. | |
| 2009/0313562 A1 | 12/2009 | Appleyard et al. | |
| 2010/0082747 A1 | 4/2010 | Yue et al. | |
| 2011/0055322 A1* | 3/2011 | Gregersen | 709/203 |
| 2011/0289155 A1 | 11/2011 | Pirnazar | |
| 2012/0030288 A1 | 2/2012 | Burckart et al. | |
| 2012/0047449 A1 | 2/2012 | Burckart et al. | |
| 2012/0159305 A1 | 6/2012 | Amrhein et al. | |
| 2012/0198026 A1 | 8/2012 | Roy et al. | |
| 2014/0207872 A1 | 7/2014 | Roy et al. | |
| 2015/0067181 A1 | 3/2015 | Roy et al. | |
| 2015/0149916 A1 | 5/2015 | Mendez et al. | |

* cited by examiner

| Time | URL | Cursor Position | Form Field Value |
|---|---|---|---|
| 18:02 | http://www.example.com/products | x= 40, y= 10, top frame, Search Text Box | Search Category Drop-Down List Box = "Electronics"<br><br>Search Text Box = "Mobile Phones" |
| 18:10 | http://www.example.com/products | x= 40, y= 30, main frame, Product A DIV tag, Product A radio button | Product A radio button = checked |
| 18:11 | http://www.example.com/products | x= 60, y= 30, main frame, "Add To Cart – Product A" image, Product A radio button | Product A radio button = checked |
| 18:12 | http://www.example.com/products | x= 90, y= 10, top frame, "My Cart" image | |
| 18:13 | https://www.example.com/cart | x= 80, y= 20, main frame, Product A Price DIV tag | |
| 18:16 | https://www.example.com/cart | x= 10, y= 20, main frame, Remove Product A DIV tag | |
| 18:18 | http://www.sample.com/products | x= 60, y= 80, main frame, Product X Price DIV tag | |
| 18:23 | http://www.example.com/products | x= 40, y= 60, main frame, Product B DIV tag, Product B radio button | Product B radio button = checked |
| 18:24 | http://www.example.com/products | x= 60, y= 60, main frame, "Add To Cart – Product B" image, Product B radio button | Product B radio button = checked |
| 18:25 | http://www.example.com/products | x= 90, y= 10, top frame, "My Cart" image | |
| 18:26 | https://www.example.com/cart | x= 90, y= 90, main frame, "Proceed To Checkout" image | |

| Remove | Description | Quantity | Price |
|---|---|---|---|
| Ⓧ | PRODUCT A | 1 | $100 |
| | | 2 | $400 ($200 each) |
| | | 1 | $50 |

We see that you have Product B in your Cart. We suggest that you look at the following related Products:

PRODUCT D

PRODUCT E

Subtotal: $550
Shipping: Enter Zip Code
Tax: $55
TOTAL: $605

Continue Shopping    1310    Proceed To Checkout

| Remove | Description | Quantity | Price |
|---|---|---|---|
| X | PRODUCT A | 1 | $100 |
| X | PRODUCT B | 2 | $400 ($200 each) |
| X | PRODUCT C | 1 | $50 |

We note that Product B and Product C in your Cart are incompatible with one another. Instead of Product B, may we suggest Product D below. Click on Product D to confirm the selection.

PRODUCT D ⎯ 1415

1410

Subtotal: $550
Shipping: Enter Zip Code
Tax: $55
TOTAL: $605

Continue Shopping        Proceed To Checkout

| Time | URL | Region | Communication Interface Data |
|------|-----|--------|------------------------------|
| 8:02 | http://www.example.com/products | x= 40, y= 30, main frame, Product A DIV tag, Product A radio button | |
| 8:03 | http://www.example.com/products | x= 40, y= 30, main frame, Product A DIV tag, Product A radio button | Window 1 = "User 1: Product A looks interesting" |
| 8:04 | http://www.example.com/products | x= 40, y= 30, main frame, Product A DIV tag, Product A radio button | Window 1 = "User 2: It does seem to be a good value" |
| 8:05 | http://www.example.com/products | x= 40, y= 60, main frame, Product B DIV tag, Product B radio button | |
| 8:06 | http://www.example.com/products | x= 40, y= 60, main frame, Product B DIV tag, Product B radio button | Window 2 = "User 1: On second thought, Product B outperforms product A and is lower in price" |
| 8:07 | https://www.example.com/products | x= 40, y= 60, main frame, Product B DIV tag, Product B radio button | Window 2 = "User 2: Good point; I'm going to purchase Product B" |

FIGURE 21

ANALYZING NAVIGATION WITH A WEBPAGE

RELATED APPLICATIONS

The present application is a continuation-in-part of U.S. patent application Ser. No. 12/210,463, filed Sep. 15, 2008, entitled "METHOD, WEB BROWSER AND SYSTEM FOR CO-BROWSING ONLINE CONTENT," naming Ashutosh Roy and Promod Narang as inventors, assigned to the assignee of the present invention, and which claims the benefit of U.S. Provisional Patent Application No. 61/039,370, filed Mar. 25, 2008, entitled "PEER TO PEER CENTRIC N-WAY BROWSING (CO-BROWSER)," naming Ashutosh Roy and Promod Narang as inventors. Those applications are incorporated herein by reference in their entirety and for all purposes.

The present application also claims the benefit of U.S. Provisional Patent Application No. 61/294,032, filed Jan. 11, 2010, entitled "INTRAPAGE NAVIGATION ANALYSIS," naming Ashutosh Roy, Promod Narang, Jeffrey Huang and Sam Hahn as inventors. That application is incorporated herein by reference in its entirety and for all purposes.

The present application is related to U.S. patent application Ser. No. 13/004,804, filed Jan. 11, 2011, entitled "COMMUNICATION ASSOCIATED WITH A WEBPAGE," naming Ashutosh Roy, Promod Narang, Jeffrey Huang, and Sam Hahn as inventors, assigned to the assignee of the present invention. That application is incorporated herein by reference in its entirety and for all purposes.

BACKGROUND OF THE INVENTION

Certain information about a user's interactions with a webpage is accessible to a webpage provider. For example, navigation from one webpage to another webpage will often initiate a request that is communicated to a web server, thereby enabling the web server to log the webpages visited by a user and when each web page was visited. In this manner, a web server's logs only contain information based on requests or other data received by the web server.

Although some information about a user's interactions with a webpage may be determined from the web server's logs, the information contained therein is limited. For example, although the duration of the user's visit to a particular web page may be determined based on when a user navigated to and from the particular webpage, the information stored in the web server's logs is insufficient to determine how the user was interacting with the webpage during the visit.

SUMMARY OF THE INVENTION

Accordingly, a need exists to determine how a user interacts with a webpage during a visit to the webpage. A need also exists to determine how a user interacts with a webpage based on information other than requests or other communications to a web server. Embodiments of the present invention provide novel solutions to these needs and others as described below.

Embodiments of the present invention are directed to a method, computer-readable medium and system for analyzing navigation of a webpage. More specifically, data associated with navigation of a webpage is monitored using a component (e.g., a plug-in to the web browser) running on a computer system which also runs a web browser used to display the web page. The data may include the position of a mouse cursor displayed on a display device and/or a state of a form field of the webpage (e.g., at least one character entered in a text box, at least one character entered in a text area box, at least one item selected using a drop-down list box, a checked state of a radio button, an unchecked state of a radio button, a checked state of a checkbox, an unchecked state of a checkbox, etc.). In this manner, information about user interactions with a webpage which do not involve or initiate a communication with a web server can be accessed.

In one embodiment, the information about user interactions with a webpage may be analyzed and used to perform one or more operations. For example, a mouse cursor that stays in the same location or region for a certain duration may indicate that a user is having difficulty, and therefore, content (e.g., a chat window or other content enabling a chat session and/or co-browsing session, a suggestion, etc.) may be displayed to assist or guide the user. As another example, if a mouse cursor is near or on a price of an item in a cart and the item is later removed from the cart, information may be communicated to the retailer of the product that the reason for the user not purchasing the item was the price. And as yet another example, if incompatible items are placed in a cart on a webpage, content may be displayed which communicates the incompatibility and/or suggests at least one alternative product for the user. Thus, in addition to providing information about user interactions with a webpage, embodiments of the present invention can automatically perform one or more operations based on the information.

In one embodiment, a computer-implemented method of analyzing navigation of a webpage includes monitoring data associated with navigation of the webpage displayed using a web browser, wherein the monitoring is performed using a component running on a computer system running the web browser. The data is analyzed to determine other data associated with navigation of the webpage, wherein the analyzing further comprises applying at least one rule to the data to determine the other data. At least one operation is performed based on the other data.

In another embodiment, a computer-readable medium may have computer-readable program code embodied therein for causing a computer system to perform a method of analyzing navigation of a webpage. And in yet another embodiment, a system may include a processor and a memory, wherein the memory includes instructions that when executed by the system implement a method of analyzing navigation of a webpage.

BRIEF DESCRIPTION OF THE DRAWINGS

The present invention is illustrated by way of example, and not by way of limitation, in the figures of the accompanying drawings and in which like reference numerals refer to similar elements.

FIG. 10 shows an exemplary on-screen webpage for purchasing items in accordance with one embodiment of the present invention.

FIG. 11 shows an exemplary data structure including data associated with navigation of the webpage in accordance with one embodiment of the present invention.

FIG. 13 shows an on-screen webpage altered by displaying a product suggestion in accordance with one embodiment of the present invention FIG. 14 shows an on-screen webpage altered by displaying a product suggestion based on an incompatibility between products in a user's cart in accordance with one embodiment of the present invention.

FIG. 21 shows an exemplary data structure including at least one communication associated with a webpage in accordance with one embodiment of the present invention.

DETAILED DESCRIPTION OF THE INVENTION

Figure 1:
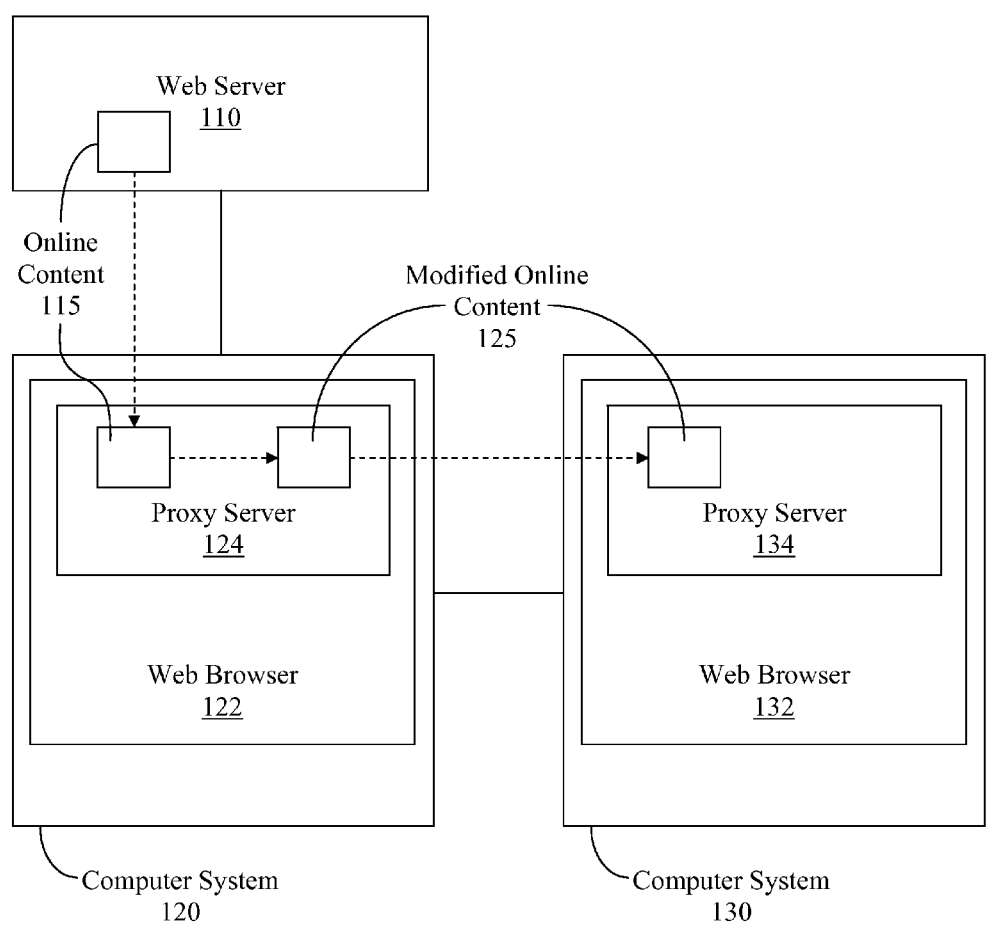
FIG. 1 shows an exemplary system for two or more computer systems co-browsing online content in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

NOTATION AND NOMENCLATURE

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "analyzing," "applying," "assembling," "assigning," "balancing," "blocking," "calculating," "capturing," "combining," "comparing," "collecting," "creating," "debugging," "defining," "delivering," "depicting," "detecting," "determining," "displaying," "establishing," "executing," "flipping," "generating," "grouping," "hiding," "identifying," "initiating," "interacting," "managing," "manipulating," "modifying," "monitoring," "moving," "outputting," "performing," "placing," "presenting," "processing," "programming," "providing," "querying," "removing," "repeating," "resuming," "sampling," "searching," "showing," "simulating," "sorting," "storing," "subtracting," "suspending," "tracking," "transcoding," "transferring," "transforming," "unblocking," "updating," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

Co-Browsing of Online Content

FIG. 1 shows exemplary system 100 for two or more computer systems co-browsing online content in accordance with one embodiment of the present invention. As shown in FIG. 1, a co-browsing session may be established between web browser 122 running on computer system 120 and web browser 132 running on computer system 130, where each of computer systems 120 and 130 have a respective peer proxy server (e.g., 124 and 134, respectively). Peer proxy server 124 may be a primary peer proxy server, and thus, communicate directly with web server 110. For example, peer proxy server 124 may access online content 115 (e.g., including code, images, video, or other content related to a web page or otherwise accessed through the Internet) and generate modified online content 125 for access by web browser 132. Simultaneous access of online content 115 by computer system 120 and modified online content 125 by computer system 130 may enable simultaneous co-browsing of the online content by web browsers 122 and 132 in one embodiment. This co-browsing may be transparent to or undetected by web server 110.

Modified online content 125 may direct all browser events or other communications related to online content 115 and/or modified online content 125 through peer proxy server 124 (e.g., by tagging or encoding modified online content 125 and/or other communications to indicate primary peer proxy server 124, as opposed to web server 110, as the origin of modified online content 125 and/or the other communications), thereby enabling users of both web browsers 122 and 132 to interact with (e.g., activate links, enter information into fields, play content, etc.) online content 115. Additionally, peer proxy server 124 may synchronize modified online content 125 with online content 115 (e.g., by sending a peer proxy response based upon a web server response received from web server 110 in response to a browser event generated by web browser 122 and/or 132), thereby enabling web browsers 122 and 132 to present respective content (e.g., 115 and 125) which is substantially similar in appearance. In this manner, a user of web browser 132 may co-browse online content 115 simultaneously with a user of web browser 122.

Co-browsing as used herein may refer to any interaction with online content (e.g., a web page or other content accessed through the internet) using a plurality of web browsers (e.g., 122, 132, etc.). The content displayed or presented using the web browsers (e.g., 122, 132, etc.) may have a similar or identical appearance in one embodiment. However, the underlying coding of modified online content 125 may be different from that of online content 115 (e.g., without substantially affecting the appearance of modified online content 125 since the coding is not readily visible to a user of the web browser), thereby enabling the modified coding of modified online content 125 to direct browser events (e.g., generated by web browser 132) to primary peer proxy server 124 for carrying out co-browsing operations in a way that is transparent to or undetected by web server 110.

In one embodiment, the web browsers (e.g., 122, 132, etc.) used to implement a co-browsing session may include at least two different types (e.g., versions, brands, mobile vs. non-mobile, configured to run on different operating systems, configured to run on different computer systems, etc.) of web browsers. And in one embodiment, the viewports or windows (e.g., including the online content being co-browsed, displayed on a display device of a computer system, etc.) corresponding to the web browsers (e.g., 122, 132, etc.) used to implement a co-browsing session may be different shapes, sizes, aspect ratios, etc.

Figure 5:
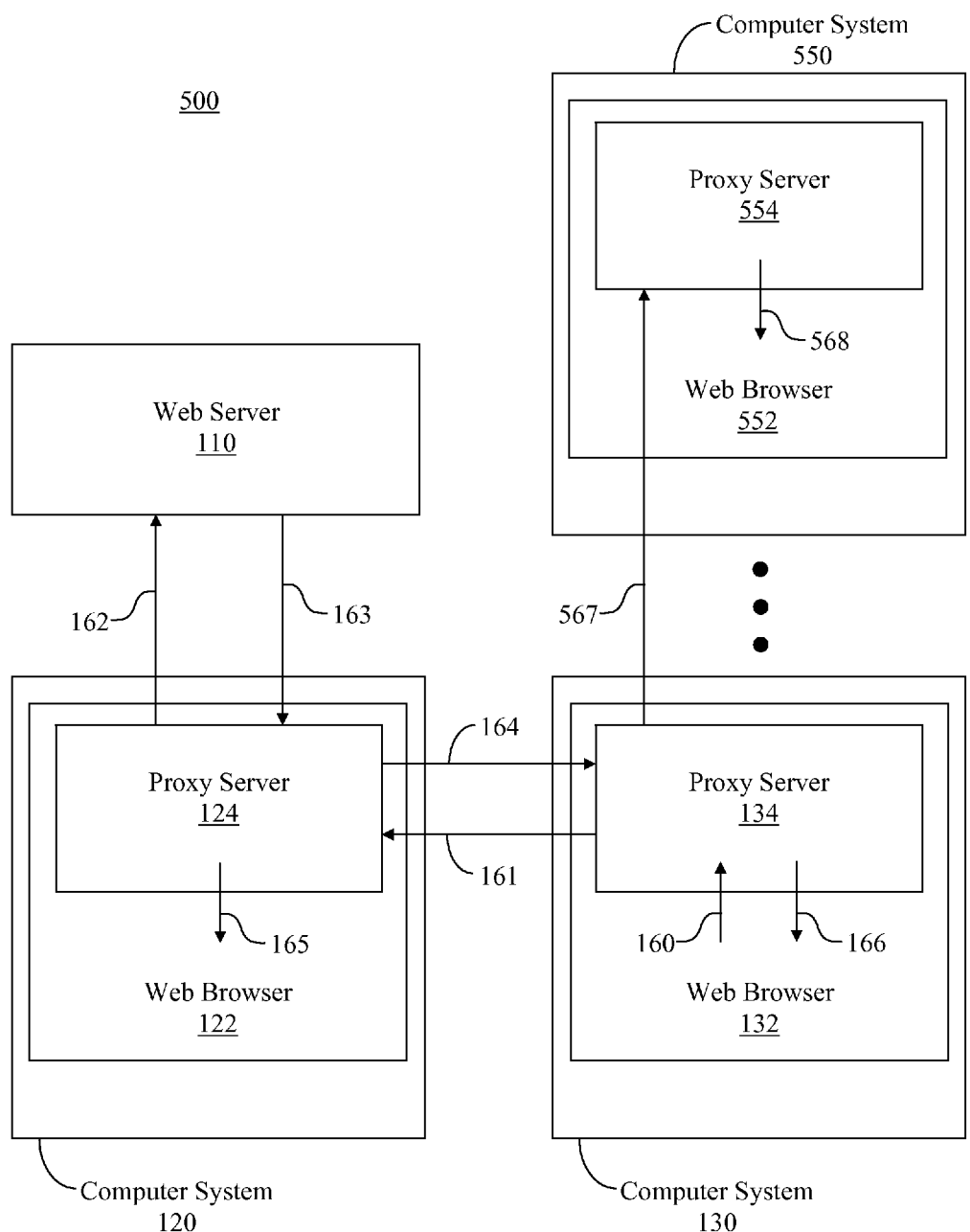
FIG. 5 shows an exemplary system for co-browsing online content with at least three computer systems coupled in a daisy-chain arrangement in accordance with one embodiment of the present invention.

Computer systems 120 and 130 may be disposed remotely from one another. For example, computer system 120 may be located in one room of a house, while computer system 130 is located in another room of the same house. Alternatively, computer systems 120 and 130 may be located more remotely from one another (e.g., in different states, in different countries, etc.). Accordingly, embodiments enable co-browsing sessions to be carried out over very long distances. Additionally, since peer proxy servers 124 and 134 are run locally on their respective computer systems (e.g., as a web browser plug-in, as a process separate from the web browser as shown in FIG. 5, etc.), embodiments enable co-browsing of online content without needing to download large pieces of code and without reliance on server-side co-browsing code in one embodiment.

Co-browsing using a plurality of web browsers (e.g., 122, 132, etc.) may be used to assist users (e.g., in filling out forms of a web page, navigating web pages, etc.) in one embodiment. Alternatively, presentations may be carried out using system 100, where the content (e.g., 115, 125, etc.) may include content of a presentation to be accessed and/or modified by remote parties. And in one embodiment, co-browsing using system 100 may be used to play games (e.g., where the content is that of a game). Alternatively, system 100 may be used in any other scenario (e.g., shopping, research, etc.) where viewing and/or modifying substantially the same content may be beneficial.

In one embodiment, access restrictions may be set by one or more users participating in a co-browsing session. For example, a first user may limit a second user's ability to edit a form or field, thereby providing read-only access to other users. As another example, a user may limit the ability for other users to see or otherwise access certain types of information (e.g., social security numbers, credit card numbers, other confidential or secure information, etc.). As a further example, a user may limit the ability of other users to perform certain actions associated with the online content (e.g., click on a button or link to consummate a purchase, etc.).

Access restrictions set by users may be used to generate the modified online content (e.g., 125) from the online content (e.g., 115) in one embodiment. For example, where credit card information is to be restricted as indicated by a user-initiated access restriction, the modified online content (e.g., 125) may be generated such that information from the online content (e.g., 115) associated with credit card information is hidden or is otherwise inaccessible to a user viewing the modified online content (e.g., 125).

Figure 2:
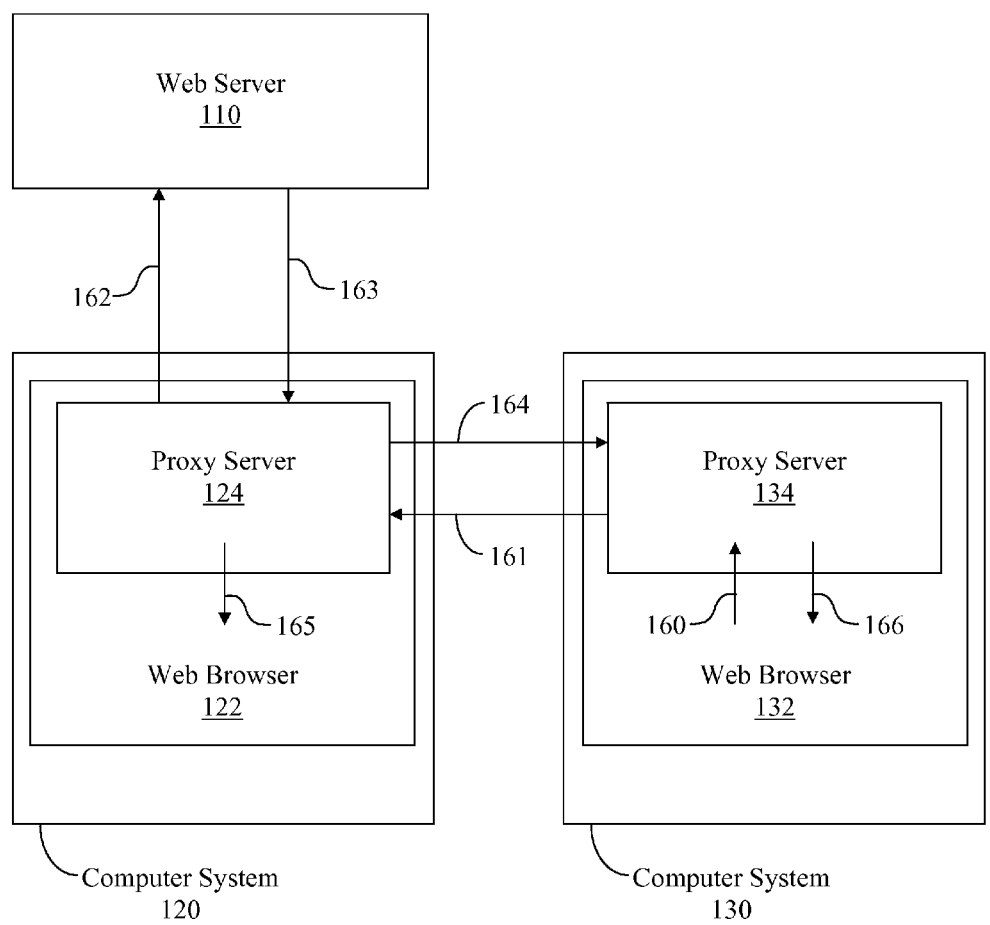
FIG. 2 shows an exemplary system for synchronizing online content in response to a browser event in accordance with one embodiment of the present invention.

FIG. 2 shows exemplary system 100 for synchronizing online content in response to a browser event in accordance with one embodiment of the present invention. As shown in FIG. 2, system 100 may synchronize online content (e.g., 115) and modified online content (e.g., 125) using respective browser commands (e.g., 165 and 166) generated in response to a browser event (e.g., 160). For example, browser command 165 may be communicated to web browser 122 (e.g., for updating online content 115 presented using web browser 122) and browser command 166 may be communicated to web browser 132 (e.g., for updating modified online content 125 presented using web browser 132), where the synchronization of the content may be in response to a browser event (e.g., 160, a browser event generated by web browser 122, etc.).

Browser event 162 may be generated by web browser 132 and communicated to peer proxy server 134. Browser event 162 may be any event generated in response to a user interaction with the web browser (e.g., 132). For example, browser event 162 may be generated in response to a user-submission of a form, entry of text into a user-modifiable field, a user selection of a link, etc. Although not shown in FIG. 2, it should be appreciated that synchronization of online content 115 and modified online content 125 during a co-browsing session may occur in response to a browser event communicated from web browser 122 to peer proxy server 124.

Peer proxy server request 161 may be generated in response to browser event 160 and communicated from peer proxy server 134 to peer proxy server 124. Generation and communication of the peer proxy response (e.g., 161) may occur based upon coding of modified online content 125 (e.g., including code modifications made to online content 115). Further, it should be appreciated that the generation and communication of peer proxy response 161 may be preformed using embodiments of the present invention in lieu of communicating a response directly to web server 110 in one embodiment.

Web server request 162 may be generated by peer proxy server 124 and communicated to web server 110. Web server request 162 may be generated based upon peer proxy server request 161 in one embodiment. Additionally, the web server request (e.g., 162) may indicate that the primary peer proxy server (e.g., 124) is the origin of the browser event (e.g., 160), thereby directing the web server (e.g., 110) to communicate web server responses (e.g., 163) to the primary peer proxy server (e.g., 124). Alternatively, web server request 162 may be generated in response to a browser event generated by web browser 122 (not shown in FIG. 2) and communicated to peer proxy server 124.

Web server response 163 may be generated by web server 110 and communicated to peer proxy server 124. Additionally, peer proxy response 164 may be generated by peer proxy server 124 and communicated to peer proxy server 134. Web server response 163 may be generated based upon web server request 162, and peer proxy response 164 may be generated based upon web server response 163.

Web server response 163 may indicate how online content 115 can be updated (e.g., using browser command 165) in response to the browser event (e.g., 160), while peer proxy response 164 may indicate how modified online content 125 can be updated (e.g., using browser command 166) in response to the browser event (e.g., 160). For example, if the browser event (e.g., 160) was generated in response to a submission of a form, web server response 163 and/or peer proxy response 164 may include data for displaying a different web page (e.g., on web browsers 122 and 132) informing a user that the form has been successfully submitted (e.g., thereby synchronizing online content 115 with modified online content 125 using browser commands 165 and 166). Alternatively, if the browser event (e.g., 160) was generated in response to text entered by a user in a user-modifiable field (e.g., of modified online content 125 presented using web browser 132), web server response 163 and/or peer proxy response 164 may include data for updating online content 115 to present the text on web browser 122 (e.g., thereby synchronizing online content 115 with modified online content 125 using browser command 165).

As shown in FIG. 2, the co-browsing session between web browsers 122 and 132 may be implemented such that web server 110 and web browsers 122 and 132 are unaware of the collaboration between peer proxy servers 124 and 134. For example, web browser 132 may operate without knowledge of web browser 122, while web browser 122 may operate without knowledge of web browser 132. Similarly, web server 110 may be unaware of web browser 132, and more specifically, web server 110 may be unaware that content (e.g., modified online content 125) and/or other information is passed from peer proxy server 124 to peer proxy server 134 in one embodiment. Accordingly, embodiments enable co-browsing a wide variety of content (e.g., authenticated or secure online content, streaming content, etc.). Further, embodiments reduce the interruptions caused by initiating and/or terminating the co-browsing session, thereby enabling a user of web browser 122 to seamlessly access the online content (e.g., 115) regardless of the state of the co-browsing session with web browser 132.

Figure 3:
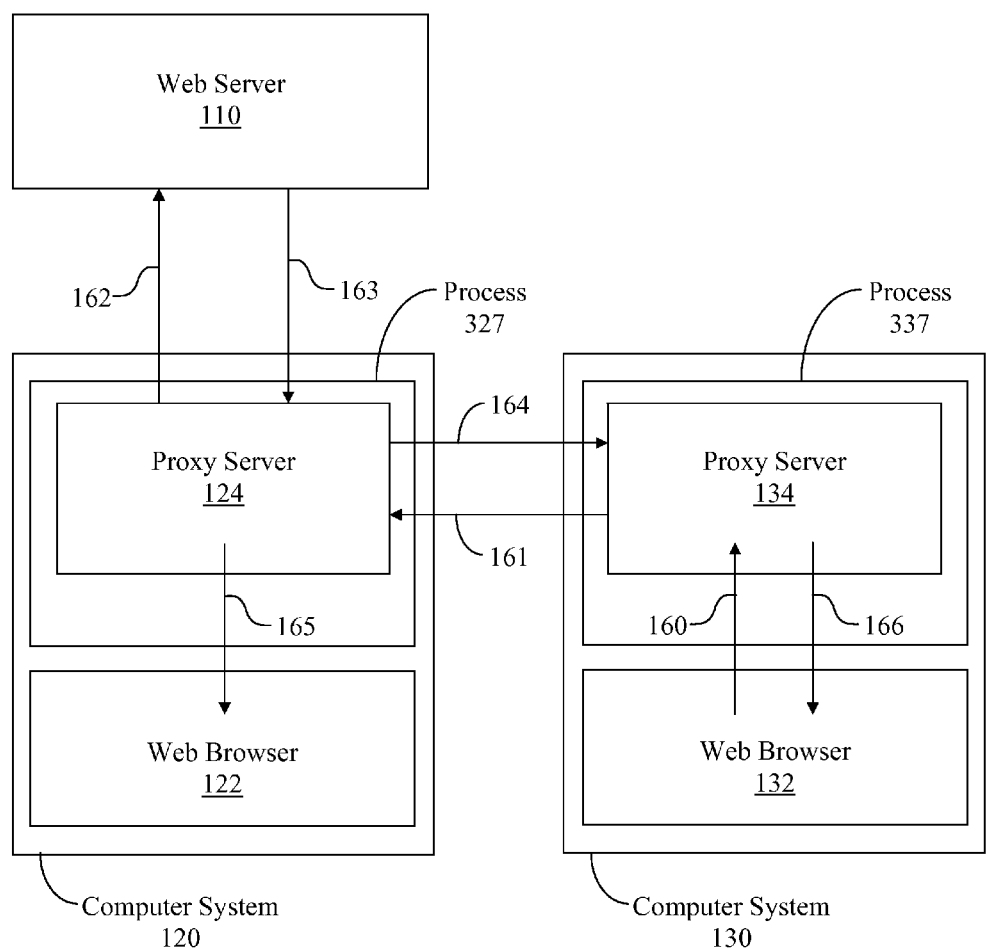
FIG. 3 shows an exemplary system for co-browsing online content with peer proxy servers running in a process separate from the web browser in accordance with one embodiment of the present invention.

Although FIGS. 1 and 2 show peer proxy servers 124 and 134 running within (e.g., as a plug-in module, etc.) a respective web browser (e.g., 122 and 132), the peer proxy servers may run outside of the respective web browsers (e.g., 122 and 132) in other embodiments. For example, FIG. 3 shows exemplary system 100 for co-browsing online content with peer proxy servers running in a process separate from the web browser in accordance with one embodiment of the present invention. As shown in FIG. 3, peer proxy server 124 may run within process 327 of computer system 120, while peer proxy server 134 may run within process 337 of computer system 130. Processes 327 and 337 may be any process separate from the respective web browser (e.g., 122 and 132) running on the respective computer system (e.g., 120 and 130). Accordingly, communications (e.g., browser event 160, browser command 165, browser command 166, etc.) may be communicated between each respective web browser (e.g., 122 and 132) and each respective peer proxy server (e.g., 124 and 134) via a respective process (e.g., 327 and 337).

Figure 4:
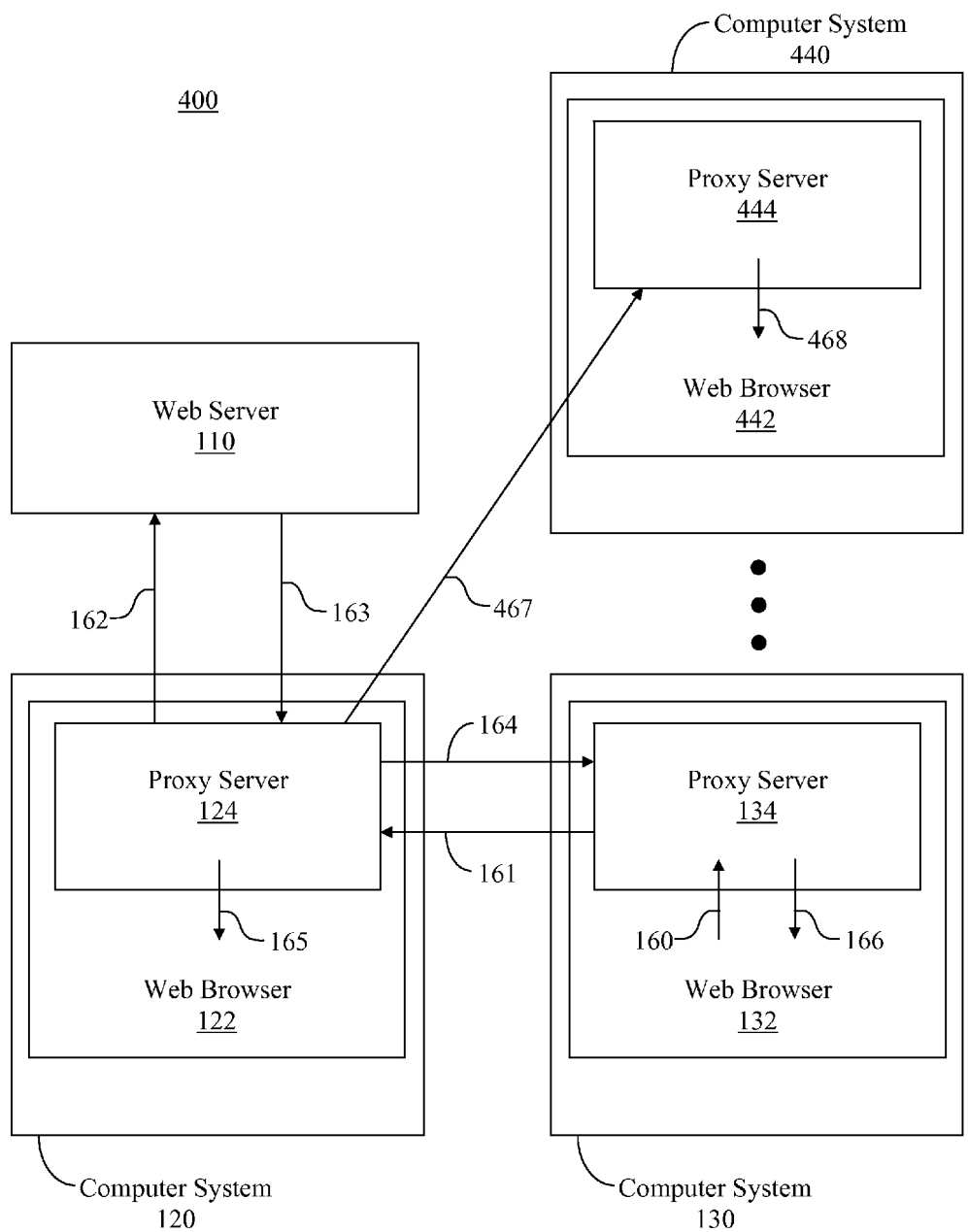
FIG. 4 shows an exemplary system for co-browsing online content with at least three computer systems coupled in a hub-and-spoke arrangement in accordance with one embodiment of the present invention.

Additionally, although FIGS. 1 and 2 show only two computer systems (e.g., 120 and 130) participating in a co-browsing session, it should be appreciated that a co-browsing session with a greater number of computer systems may be implemented in other embodiments. For example, FIG. 4 shows exemplary system 400 for co-browsing online content with at least three computer systems coupled in a hub-and-spoke arrangement in accordance with one embodiment of the present invention. As shown in FIG. 4, computer systems 120, 130 and 440 are coupled in a hub-and-spoke arrangement where each of the secondary peer proxy servers (e.g., 134, 444, etc.) communicates directly with the primary peer proxy server (e.g., 124). For example, peer proxy requests (e.g., 161, a peer proxy request generated in response to a browser event from web browser 442, etc.) are communicated directly to the primary peer proxy server (e.g., 124). Similarly, peer proxy responses (e.g., 164, 467 communicated to peer proxy server 444, etc.) generated based upon the web server response (e.g., 163) may also be communicated directly to each of the secondary peer proxy servers (e.g., 134, 444, etc.) from the primary peer proxy server (e.g., 124), thereby enabling generation of respective browser commands (e.g., 165, 166, 468, etc.) for synchronizing the online content (e.g., 115) presented on computer system 120 with the modified online content (e.g., 125) presented on the other computer systems (e.g., 130, 440, etc.) coupled in the hub-and-spoke arrangement. It should be appreciated that the primary peer proxy server (e.g., 124) and the secondary peer proxy servers (e.g., 134, 444, etc.) may communicate with one another using bidirectional communication, unidirectional communication, or some combination thereof.

In one embodiment, a secondary peer proxy server (e.g., 444) may be added to the co-browsing session by the primary peer proxy server (e.g., 124) and/or another secondary peer proxy server (e.g., 134). In one embodiment, a secondary peer proxy server (e.g., 134) that adds or brings in another secondary peer proxy server (e.g., 444) may drop off or leave the co-browsing session while the other secondary peer proxy server (e.g., 444) remains in the co-browsing session (e.g., with primary peer proxy server 124, at least one other secondary peer proxy server, etc.). And in one embodiment, any peer proxy server (e.g., primary peer proxy server 124, secondary peer proxy server 134, secondary peer proxy server 444, another secondary peer proxy server, etc.) that drops off or leaves the co-browsing session may return to the co-browsing session at a later time.

Additionally, FIG. 5 shows exemplary system 500 for co-browsing online content with at least three computer systems coupled in a daisy-chain arrangement in accordance with one embodiment of the present invention. As shown in FIG. 5, computer systems 120, 130 and 550 are coupled in a daisy-chain arrangement where a secondary peer proxy server (e.g., 554) communicates with the primary peer proxy server (e.g., 124) via at least one other peer proxy server (e.g., 134). For example, peer proxy requests (e.g., 161, a peer proxy request generated in response to a browser event from web browser 552, etc.) are communicated to the primary peer proxy server (e.g., 124) via at least one other peer proxy server (e.g., 134). Similarly, peer proxy responses (e.g., 164, 567 communicated to peer proxy server 554, etc.) generated based upon the web server response (e.g., 163) may also be communicated to a secondary peer proxy servers (e.g., 554) from the primary peer proxy server (e.g., 124) via at least one other peer proxy server (e.g., 134), thereby enabling generation of respective browser commands (e.g., 165, 166, 568, etc.) for synchronizing the online content (e.g., 115) presented on computer system 120 with the modified online content (e.g., 125) presented on the other computer systems (e.g., 130, 550, etc.) coupled in the daisy-chain arrangement. It should be appreciated that the primary peer proxy server (e.g., 124) and the secondary peer proxy servers (e.g., 134, 554, etc.) may communicate with one another using bidirectional communication, unidirectional communication, or some combination thereof.

In one embodiment, a secondary peer proxy server (e.g., 554) may be added to the co-browsing session by the primary peer proxy server (e.g., 124) and/or another secondary peer proxy server (e.g., 134). In one embodiment, a secondary peer proxy server (e.g., 134) that adds or brings in another secondary peer proxy server (e.g., 554) may drop off or leave the co-browsing session while the other secondary peer proxy server (e.g., 554) remains in the co-browsing session (e.g., with primary peer proxy server 124, at least one other secondary peer proxy server, etc.). And in one embodiment, any peer proxy server (e.g., primary peer proxy server 124, secondary peer proxy server 134, secondary peer proxy server 554, another secondary peer proxy server, etc.) that drops off or leaves the co-browsing session may return to the co-browsing session at a later time.

Figure 6A:
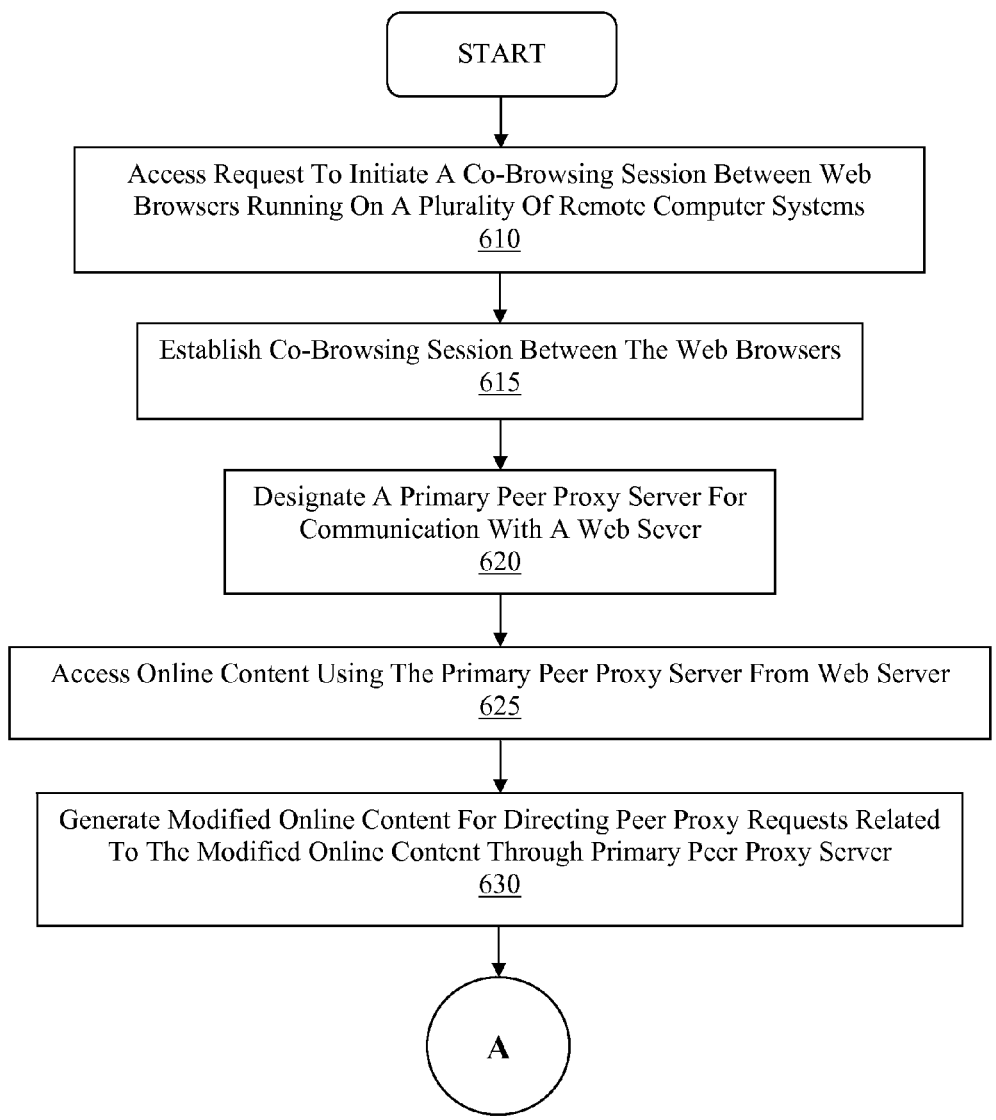
FIG. 6A shows a flowchart of a first portion of an exemplary computer-implemented process for co-browsing online content in accordance with one embodiment of the present invention.
Figure 6B:
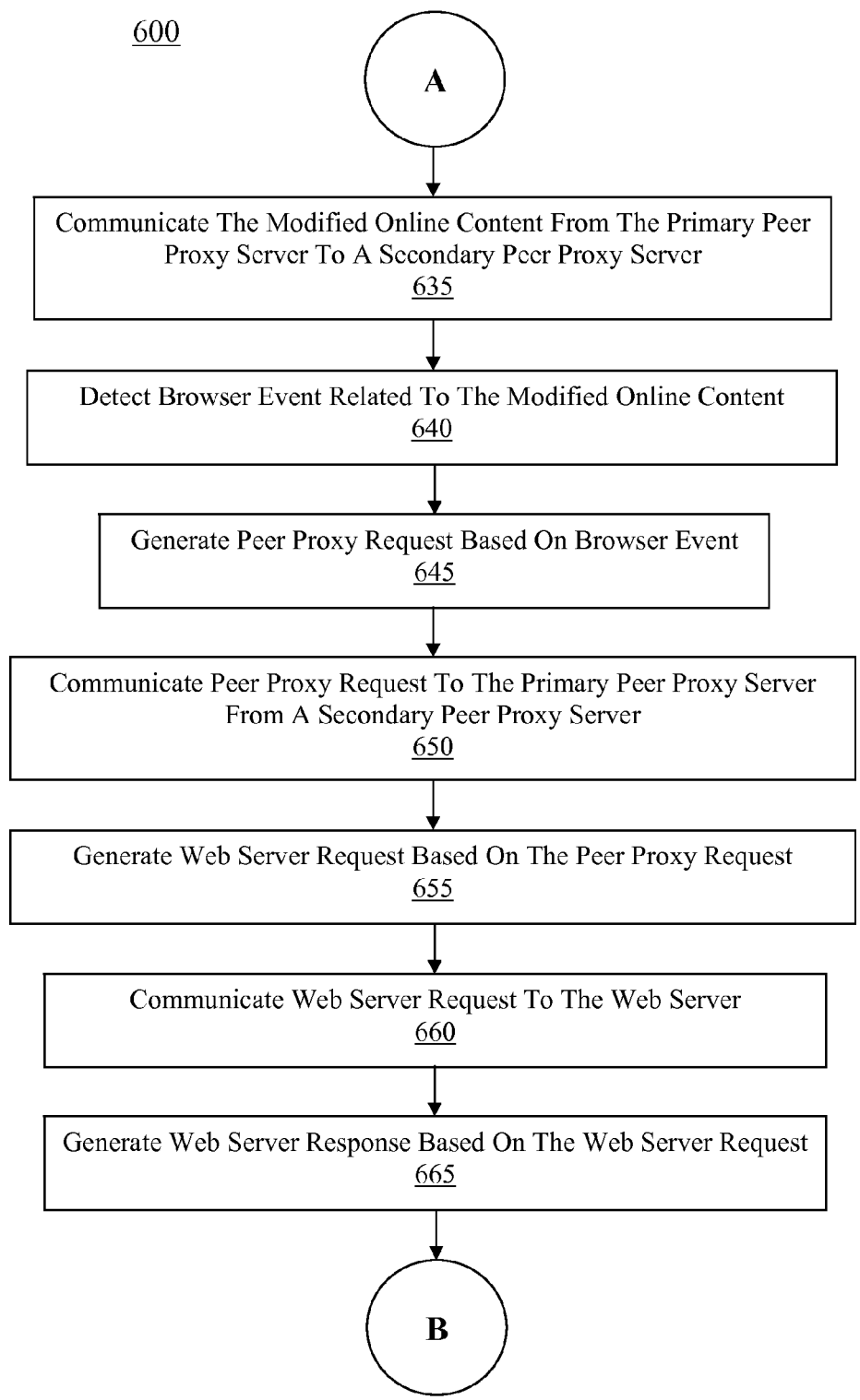
FIG. 6B shows a flowchart of a second portion of an exemplary computer-implemented process for co-browsing online content in accordance with one embodiment of the present invention.
Figure 6C:
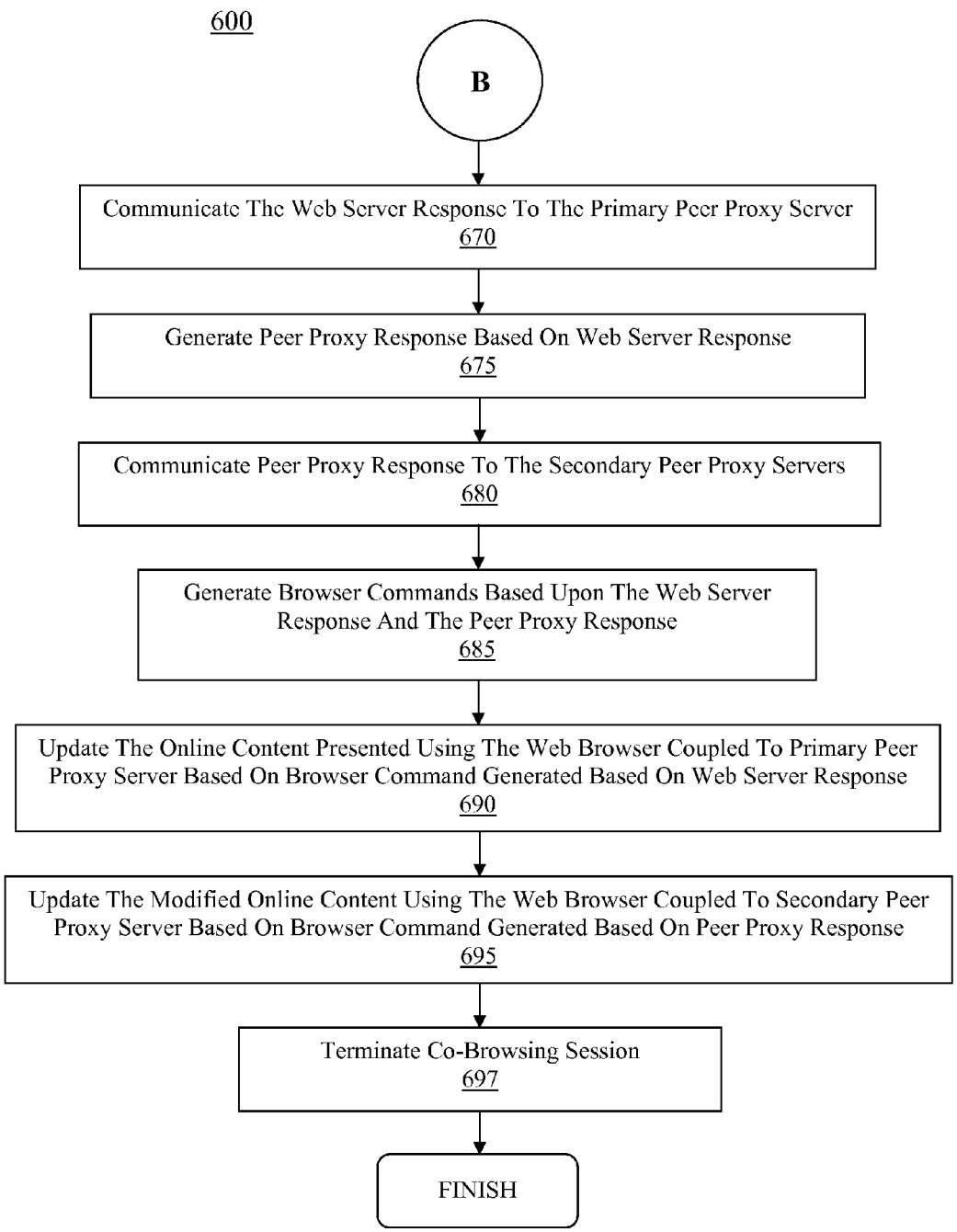
FIG. 6C shows a flowchart of a third portion of an exemplary computer-implemented process for co-browsing online content in accordance with one embodiment of the present invention.

FIGS. 6A, 6B and 6C show a flowchart of exemplary computer-implemented process 600 for co-browsing online content in accordance with one embodiment of the present invention. As shown in FIG. 6A, step 610 involves accessing a request to initiate a co-browsing session between web browsers (e.g., 122, 132, 442, 552, etc.) running on a plurality of remote computer systems (e.g., 120, 130, 440, 550, etc.). The request to initiate the co-browsing session may be generated by one of the computer systems (e.g., 120, 130, 440, 550, etc.) in response to a user-selection of one or more other computer systems (or one or more users thereof) to participate in the co-browsing session. For example, a window or drop-down menu of a graphical user interface presented on a computer system (e.g., 120, 130, 440, 550, etc.) may show one or more other users (e.g., a "buddy," group of buddies, etc.) similar to conventional instant messenger programs, thereby enabling the user of the computer system to select or identify one or more users to participate in the co-browsing session. The request generated in response to the selection of the other user may be communicated over the instant messaging network in one embodiment. Alternatively, the request may be generated via and/or accessed from a chat service, voice over internet protocol (VOIP) network, or the like.

Step 615 involves establishing the co-browsing session between the web browsers. The co-browsing session may be initiated automatically upon opening of a web browser (e.g., 122, 132, 442, 552, etc.) in one embodiment. Alternatively, the co-browsing session may be initiated automatically in response to a selection of one or more other users (e.g., in step 610) for participation in the co-browsing session in one embodiment.

Additionally, the co-browsing session may be initiated in step 615 while a user of a computer system (e.g., 120) is accessing the online content (e.g., 115). For example, a user who has trouble with the online content (e.g., filling in a form of a web page, etc.) may request the co-browsing session to receive assistance, and thus, co-browsing of the previously-accessed online content (e.g., 115) may begin in step 615 (e.g., to enable a remote user to assist the user in filling out the form). Alternatively, step 620 may be performed prior to accessing the online content (e.g., 115).

Further, one or more initialization or "handshake" procedures may be performed in step 615 by web browsers participating in the co-browsing session. Authentication procedures (e.g., exchanging of credentials such as username and password, exchange of public and/or private keys, etc.) may also be performed in step 620 during establishment of the co-browsing session between web browsers (e.g., 122, 132, 442, 552, etc.).

As shown in FIG. 6A, step 620 involves designating a primary peer proxy server (e.g., 124) for communication with a web server (e.g., 110). In one embodiment, a peer proxy server running on the computer system initiating the co-browsing session (e.g., that generates the request to initiate the co-browsing session accessed in step 610) may be designated as the primary peer proxy server. Alternatively, a plurality of rules for determining the primary peer proxy server may be accessed (e.g., from one or more of the peer proxy servers, computer systems, etc.) and used in step 620 to determine the primary peer proxy server. For example, a peer proxy server running on a computer system with the fastest or highest-bandwidth internet connection may be designated as the primary peer proxy server in one embodiment.

In one embodiment, one or more additional web browsers may join an existing co-browsing session. In this case, a request to join the existing session may be accessed as discussed with respect to step 610 herein. For example, a user requesting to join an existing co-browsing session may select the existing session (e.g., from a window, drop-down menu, etc.) and/or enter authentication and/or identification information for joining the co-browsing session (e.g., similar to joining a existing conference call), where the request may be communicated over an instant messaging network, chat service, VOIP network, or the like. Information may then be exchanged between the peer proxy server of the computer system running the new web browser and the peer proxy servers of the existing computer systems involved in the co-browsing session, thereby enabling the new web browser to join the existing co-browsing session. The new web browser may be added as a "spoke" in a hub-and-spoke arrangement (e.g., as discussed with respect to FIG. 4) in one embodiment. Alternatively, the new web browser may be added in series in a daisy-chain arrangement (e.g., as discussed with respect to FIG. 5).

Step 625 involves accessing online content using the primary peer proxy server. For example, as shown in FIG. 1, online content 115 (e.g., including code, images, video, or other content related to a web page or otherwise accessed through the Internet) may be downloaded from web sever 110 by primary peer proxy server 124.

As shown in FIG. 6A, step 630 involves generating modified online content for directing peer proxy requests related to the modified online content through the primary peer proxy server. For example, online content 115 may be accessed by primary peer proxy server 124 and used to generate modified online content 125, where online content 115 is for presentation by a first web browser (e.g., 122) and modified online content is for presentation by a second web browser (e.g., 132) running on a different computer system. The online content (e.g., 115) and the modified online content (e.g., 125) may cause the web browsers to display substantially the same information even though the underlying coding of the modified online content (e.g., 125) may be different from that of the online content (e.g., 115). For example, the modified online content (e.g., 125) may be tagged or encoded with the primary peer proxy server (e.g., 124) as the origin of the content (e.g., even though web server 110 may be the true source of online content 115), thereby directing peer proxy requests (e.g. 161 generated based upon browser event 160) from a secondary peer proxy server (e.g., 134) through the primary peer proxy server (e.g., 124).

As shown in FIG. 6B, step 635 involves communicating the modified online content from the primary peer proxy server to a secondary peer proxy server. For example, as shown in FIG. 1, modified online content 125 is communicated from primary peer proxy server 124 to secondary peer proxy server 134.

Step 640 involves detecting a browser event (e.g., 160) related to the modified online content (e.g., 125). A peer proxy request (e.g., 161) may be generated in step 645 based on the browser event (e.g., 160). Step 650 involves communicating the peer proxy request (e.g., 161) to the primary peer proxy server (e.g., 124) from a secondary peer proxy server (e.g., 134). A web server request (e.g., 162) may be generated in step 655 based on the peer proxy request (e.g., 161) from the secondary peer proxy server (e.g., 134). The web server request (e.g., 162) may indicate that the primary peer proxy server (e.g., 124) is the origin of the browser event (e.g., 160), thereby directing the web server (e.g., 110) to communicate web server responses (e.g., 163) to the primary peer proxy server (e.g., 124).

Although steps 640 through 655 have been discussed in the context of a browser event (e.g., 160) generated from a web browser of a computer system running a second peer proxy server, it should be appreciated that the browser event may be generated by a web browser (e.g., 122) of a computer system (e.g., 120) running the primary peer proxy server (e.g., 124) in one embodiment. In this case, the browser event may be detected by the primary peer proxy server (e.g., 124) and used to generate the web server request (e.g., 124).

As shown in FIG. 6B, step 660 involves communicating the web server request to the web server. For example, web server request 162 may be communicated over a network and/or the Internet to web server 110 in one embodiment.

Step 665 involves generating a web server response (e.g., 163) based upon the web server request (e.g., 162). As shown in FIG. 6C, step 670 involves communicating the web server response (e.g., 163) to the primary peer proxy server (e.g., 124). A peer proxy response (e.g., 164) may be generated (e.g., by the primary peer proxy server) in step 675 based upon the web server response (e.g., 163). The peer proxy response (e.g., 164) may be tagged or encoded to indicate that the primary peer proxy server (e.g., 124) is the origin of the response (e.g., instead of web server 110) in one embodiment, thereby enabling the response (e.g., 164) to be communicated to the appropriate secondary peer proxy server (e.g., 134, 444, 554, etc.) and/or enabling subsequent responses from the secondary peer proxy servers (e.g., 134, 444, 554, etc.) to be directed to the primary peer proxy server (e.g., 124). Step 680 involves communicating the peer proxy response (e.g., 164) to the secondary peer proxy servers (e.g., 134, 444, 554, etc.).

As shown in FIG. 6C, step 685 involves generating browser commands based upon the web server response (e.g., communicated to the primary peer proxy server in step 670) and the peer proxy response (e.g., communicated to one or more secondary peer proxy servers in step 680). For example, a browser command (e.g., 165) may be generated by the primary peer proxy server (e.g., 124) based on the web server response (e.g., 163). Another browser command (e.g., 166) may be generated by a secondary peer proxy server (e.g., 134) based on the peer proxy response (e.g., 164).

Step 690 involves updating the online content (e.g., 115) presented using the web browser (e.g., 122) coupled to the primary peer proxy server (e.g., 124) based on the browser command (e.g., 165) generated based on the web server response (e.g., 163). Step 695 involves updating the modified online content (e.g., 125) presented using the web browser (e.g., 132) coupled to the secondary peer proxy server (e.g., 134) based on the browser command (e.g., 166) generated based on the peer proxy response (e.g., 164). In this manner, steps 690 and 695 may implement a synchronization of the content presented on each of the web browsers participating in the co-browsing session.

As shown in FIG. 6C, step 697 involves terminating the co-browsing session. In one embodiment, the user of the computer system (e.g., 120) running the primary peer proxy server (e.g., 124) may continue to browse the online content (e.g., 115) with little or no interruption as a web browser (e.g., 132) of a computer system (e.g., 130) running a secondary peer proxy server (e.g., 134) drops out of the co-browsing session, is deactivated, etc. Additionally, in one embodiment, one or more of the peer proxy servers (e.g., 124, 134, 444, 554, etc.) involved in the co-browsing session may be deactivated in step 697. Alternatively, all of the peer proxy servers (e.g., 124, 134, 444, 554, etc.) involved in the co-browsing session may be deactivated in step 697.

Navigation Analysis

Figure 7:
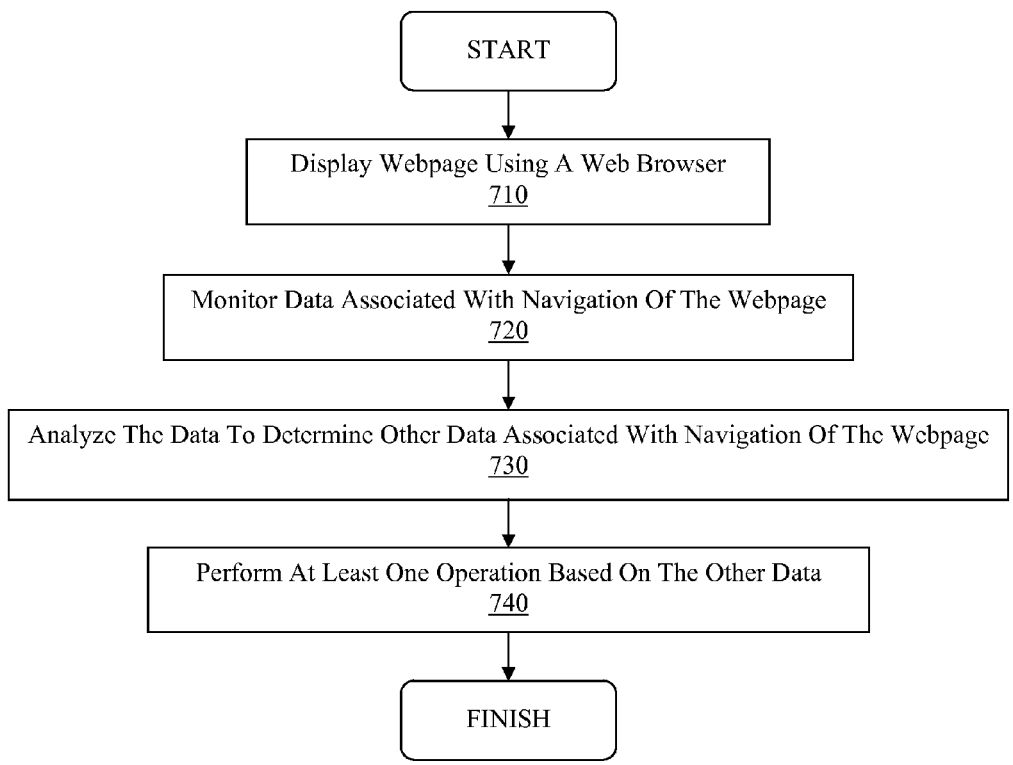
FIG. 7 shows a flowchart of a computer-implemented process for analyzing navigation of a webpage in accordance with one embodiment of the present invention.

FIG. 7 shows a flowchart of computer-implemented process 700 for analyzing navigation of a webpage in accordance with one embodiment of the present invention. Process 700 may be performed by system 800 of FIG. 8 in one embodiment, and therefore, system 800 will be discussed in conjunction with process 700.

Figure 8:
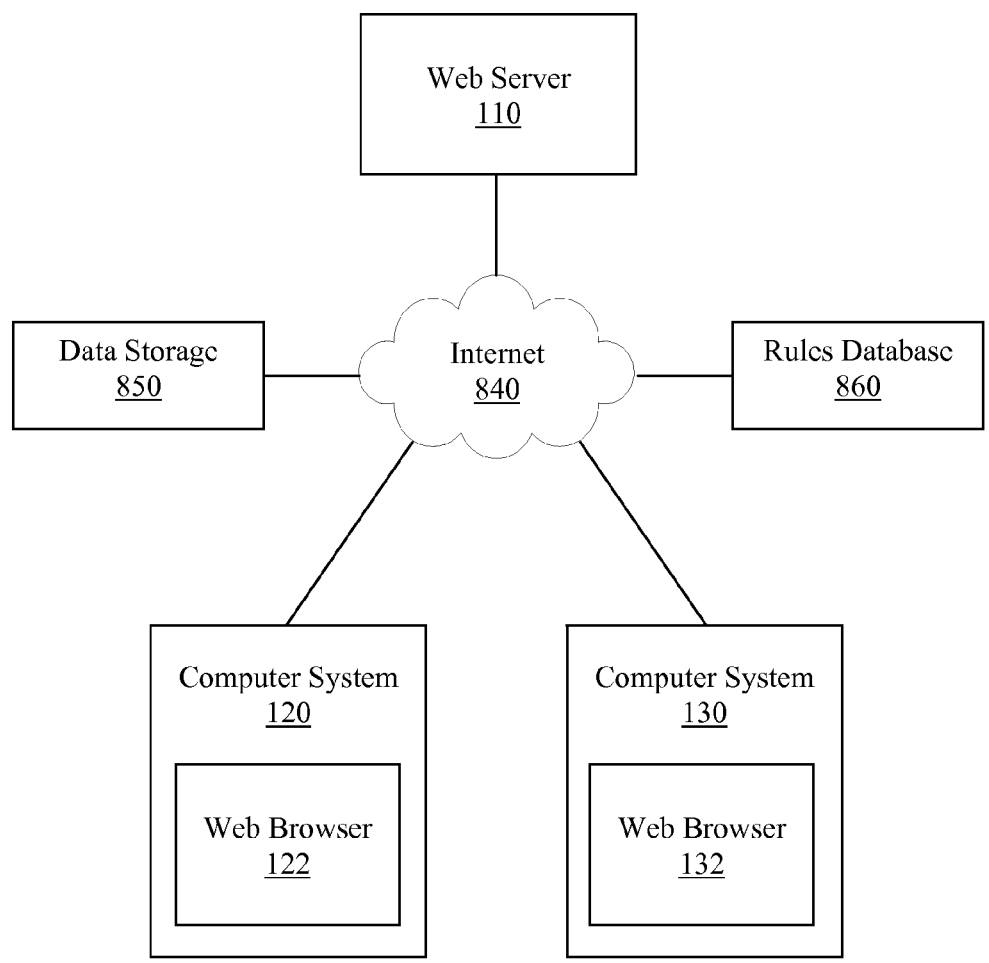
FIG. 8 shows an exemplary system for analyzing navigation of a webpage in accordance with one embodiment of the present invention.

As shown in FIG. 7, step 710 involves displaying a webpage using a web browser. For example, a webpage (e.g., 900 of FIG. 9, 1000 of FIG. 10, etc.) provided and/or hosted by a web server (e.g., 110 as shown in FIG. 8) may be displayed on a display device of a computer system (e.g., 120 as shown in FIG. 8, 130 as shown in FIG. 8, etc.) running a web browser (e.g., 122, 132, etc.). The webpage may be any type of webpage (e.g., an ecommerce webpage, a banking webpage, a social networking webpage, another type of webpage, etc.). The web server (e.g., 110) and the computer system (e.g., 120, 130, etc.) may be coupled via the Internet (e.g., 840) in one embodiment.

Figure 9:
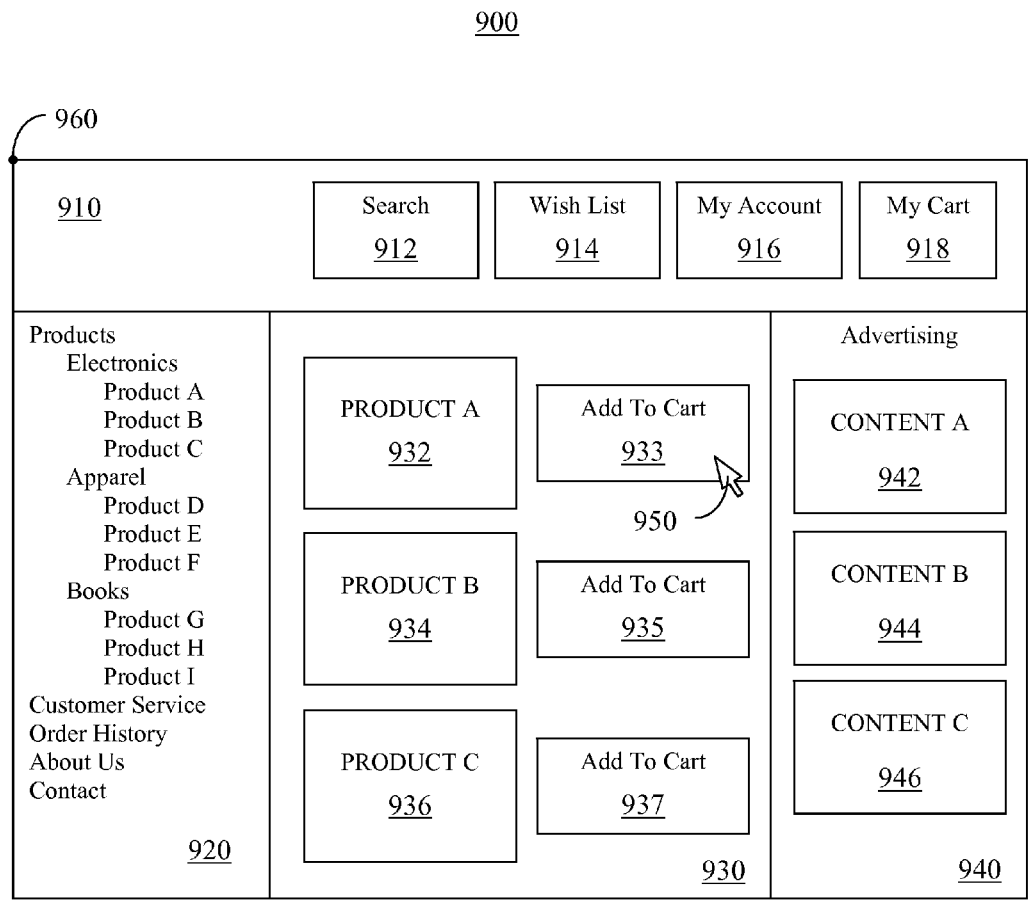
FIG. 9 shows an exemplary on-screen webpage in accordance with one embodiment of the present invention.

FIG. 9 shows exemplary on-screen webpage 900 in accordance with one embodiment of the present invention. Webpage 900 may include online content displayed within a viewport or window on a display screen of a computer system, where the window or viewport may occupy the entire display area of the display screen or some portion thereof. Webpage 900 may be an ecommerce webpage (e.g., a storefront or other webpage enabling a user to shop for and/or purchase items) in one embodiment. Alternatively, webpage 900 may be associated with a banking webpage, a social networking webpage, or any other type of webpage.

As shown in FIG. 9, webpage 900 includes at least one frame. For example, frame 910 may include region 912 for enabling a user to conduct a search (e.g., of webpage 900 or related online content, of another webpage, etc.), region 914 for enabling a user to display a wish list (e.g., created automatically based upon items not purchased by the user, created manually by the user adding products to the wish list for purchase in the future, etc.), region 916 for enabling a user to access information about an account associated with webpage 900, and region 918 for enabling a user to view a cart (e.g., webpage 1000, etc.) associated with webpage 900. Frame 920 may include a menu with at least one hyperlink enabling a user to access information (e.g., to be displayed in frame 930) associated with a certain category of product, a particular product, customer service information, order history information, information about an entity associated with webpage 900, etc.

Frame 930 may include regions (e.g., 932, 934 and 936) associated with products (e.g., Product A, Product B and Product C, respectively). Frame 930 may also include regions (e.g., 933, 935 and 937) enabling products (e.g., Product A, Product B and Product C, respectively) to be placed in a user's cart. Frame 940 may include advertising content (e.g., Content A, Content B, Content C, etc.) displayed in one or more regions (e.g., 942, 944, 946, etc.).

Each region (e.g., 912, 914, 916, 918, 932, 933, 934, 935, 936, 937, 942, 944, 946, another region, etc.) of webpage 900 may include at least one image, text, some combination thereof, etc. Additionally, each region (e.g., 912, 914, 916, 918, 932, 933, 934, 935, 936, 937, 942, 944, 946, another region, etc.) of webpage 900 may include at least one form field (e.g., a text box, text area box, drop-down list box, radio button, check box, etc.). For example, region 912 may include at least one form field enabling a user to search for information.

Although FIG. 9 depicts webpage 900 with a certain number and arrangement of elements, it should be appreciated that webpage 900 may have a different number and/or arrangement of elements in other embodiments. Additionally, although FIG. 9 depicts elements of webpage 900 with a certain size and shape, it should be appreciated that elements of webpage 900 may be a different size and/or shape in other embodiments.

Figure 10:
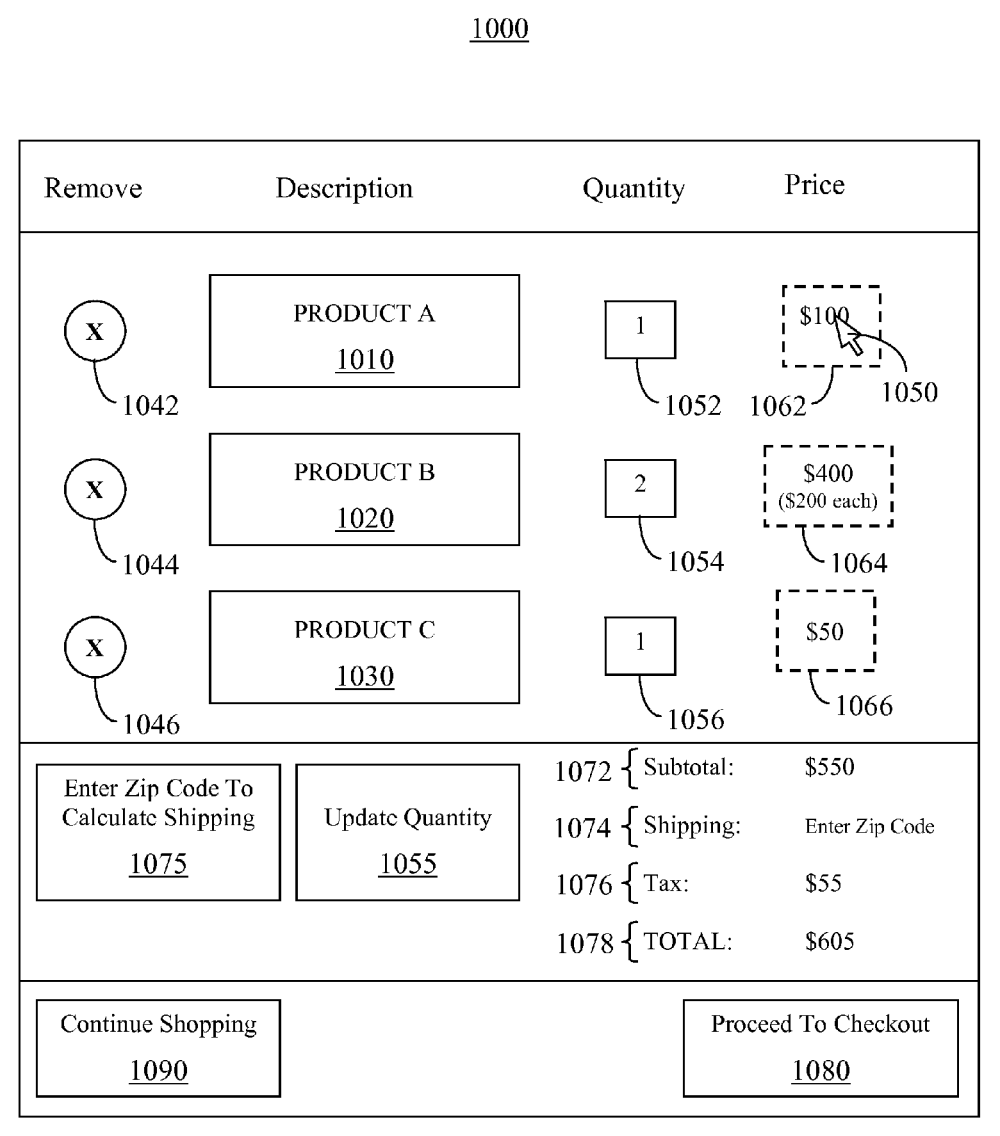

FIG. 10 shows exemplary on-screen webpage 1000 for purchasing items in accordance with one embodiment of the present invention. Webpage 1000 may include online content displayed within a viewport or window on a display screen of a computer system, where the window or viewport may occupy the entire display area of the display screen or some portion thereof. Webpage 1000 may be a "cart" displayed responsive to an interaction with a region (e.g., 918) of an ecommerce webpage (e.g., 900) in one embodiment. Alternatively, webpage 1000 may be associated with a banking webpage, a social networking webpage, or any other type of webpage.

As shown in FIG. 10, webpage 1000 includes regions (e.g., 1010, 1020, 1030, etc.) associated with products (e.g., Product A, Product B and Product C, respectively). In one embodiment, the regions (e.g., 1010, 1020, 1030, etc.) may be displayed responsive to or as a result of an interaction with a region (e.g., 933, 935, 937, etc.) of an ecommerce webpage (e.g., 900) which enables a user to add products to the user's cart.

Region 1040 may include a plurality of elements (e.g., 1042, 1044, 1046, etc.) enabling a product to be removed from a user's cart, where each element may correspond to a respective product (e.g., associated with region 1010, associated with region 1020, associated with region 1030, etc.). For example, a user interaction with element 1042 may remove Product A from the user's cart, which may cause information (e.g., at least one image, text, at least one form field, etc.) associated with Product A to be made less visible, hidden, completely removed from webpage 1000, etc.

As shown in FIG. 10, webpage 1000 may include at least one region (e.g., 1052, 1054, 1056, etc.) depicting a quantity of a particular product (e.g., associated with region 1010, associated with region 1020, associated with region 1030, etc.), where each region (e.g., 1052, 1054, 1056, etc.) may correspond to a respective product (e.g., associated with region 1010, associated with region 1020, associated with region 1030, etc.). Webpage 1000 may also include at least one region (e.g., 1062, 1064, 1066, etc.) depicting a price of a particular product (e.g., associated with region 1010, associated with region 1020, associated with region 1030, etc.), where each region (e.g., 1062, 1064, 1066, etc.) may correspond to a respective product (e.g., associated with region 1010, associated with region 1020, associated with region 1030, etc.). The price of a particular product (e.g., displayed in region 1062, 1064, 1066, etc.) may be based on a quantity of the particular product (e.g., displayed in region 1052, 1054, 1056, etc.) in one embodiment. For example, if Product B is $200 each and a quantity of "2" is indicated in region 1054, then a price of $400 may be indicated in region 1064.

In one embodiment, a user may change a quantity of a particular product (e.g., displayed in region 1052, 1054, 1056, etc.) by interacting with a particular region (e.g., by entering a different number to indicate a different quantity, etc.). An interaction with region 1055 may cause a price corresponding to the particular product (e.g., displayed in region 1062, 1064, 1066, etc.) to be adjusted to reflect the change in quantity in one embodiment.

As shown in FIG. 10, region 1072 may display a subtotal for all items in the cart (e.g., displayed in region 1010, 1020, 1030, etc.), where the subtotal may be calculated by summing the prices for each of the items in the cart (e.g., as displayed in regions 1062, 1064, 1066, etc.). Region 1074 may display a charge for shipping and/or handling, where the amount in region 1074 may be determined by a location of the user (e.g., entered using region 1075). Region 1076 may display an amount of tax to be paid for each of the items in the cart (e.g., as displayed in regions 1062, 1064, 1066, etc.). Region 1078 may display a total amount to be paid for all items in the cart (e.g., displayed in region 1010, 1020, 1030, etc.), where the subtotal may be calculated by summing the subtotal (e.g. displayed in region 1072), an amount for shipping and/or handling (e.g. displayed in region 1074), and an amount for tax (e.g. displayed in region 1076).

Region 1080 may enable a user to checkout and/or complete an order. In one embodiment, an interaction with region 1080 may cause another webpage to be displayed (e.g., enabling a user to enter a shipping address, billing address, payment information, etc.). Region 1090 may enable a user to return to continue shopping (e.g., discontinuing the checkout procedure), where an interaction with region 1090 may cause an ecommerce webpage (e.g., 900) to be displayed to enable a user to shop for and/or purchase other items.

Each region (e.g., 1010, 1020, 1030, 1042, 1044, 1046, 1052, 1054, 1055, 1056, 1062, 1064, 1066, 1072, 1074, 1075, 1076, 1078, 1080, 1090, another region, etc.) of webpage 1000 may include at least one image, text, some combination thereof, etc. Additionally, each region (e.g., 1010, 1020, 1030, 1042, 1044, 1046, 1052, 1054, 1055, 1056, 1062, 1064, 1066, 1072, 1074, 1075, 1076, 1078, 1080, 1090, another region, etc.) of webpage 1000 may include at least one form field (e.g., a text box, text area box, drop-down list box, radio button, check box, etc.). For example, region 1052 may include at least one form field enabling a user to enter a quantity.

Although FIG. 10 depicts webpage 1000 with a certain number and arrangement of elements, it should be appreciated that webpage 1000 may have a different number and/or arrangement of elements in other embodiments. Additionally, although FIG. 10 depicts elements of webpage 1000 with a certain size and shape, it should be appreciated that elements of webpage 1000 may be a different size and/or shape in other embodiments.

Turning back to FIG. 7, step 720 involves monitoring data associated with navigation of the webpage (e.g., displayed in step 710). For example, a position of a cursor (e.g., 950 of FIG. 9, 1050 of FIG. 10, etc.) and/or movement of the cursor may be monitored in step 720. As another example, step 720 may involve monitoring a user interaction with a text box and/or text area box (e.g., the entry and/or deletion of a letter, number, symbol, other character, etc.). As a further example, a selection and/or de-selection made using a drop-down list box may be monitored in step 720. And as yet another example, step 720 may involve monitoring a checking and/or unchecking of a radio button and/or checkbox.

In one embodiment, step 720 may be performed by a component of a computer system used to perform step 710. For example, data associated with navigation of the webpage may be monitored in step 720 by a component executed by the computer system running the web browser used to display the webpage in step 710, where the component may be plug-in to the web browser (e.g., 122, 132, etc.), an application separate from the web browser, etc. The plug-in may be persistent and/or stored on the computer system (e.g., 120, 130, etc.) after download (e.g., for future use such that the plug-in need not be re-downloaded to the computer system). In this manner, user interactions with a webpage may be monitored which do not initiate or are not otherwise associated with a communication with a web server (e.g., 110).

In one embodiment, step 720 may involve storing the monitored data (e.g., as a data structure similar to data structure 1100 of FIG. 11, etc.) in a data storage (e.g., 850). Alternatively, step 720 may involve storing the monitored data (e.g., as a data structure similar to data structure 1100 of FIG. 11, etc.) in a memory of computer system 120 and/or a memory of computer system 130. And in one embodiment, step 720 may involve storing the monitored data (e.g., as a data structure similar to data structure 1100 of FIG. 11, etc.) in another location.

FIG. 11 shows exemplary data structure 1100 including data associated with navigation of the webpage in accordance with one embodiment of the present invention. Data structure 1100 may include data monitored in step 720 in one embodiment. And in one embodiment, data structure 1100 may be stored in data storage 850.

As shown in FIG. 11, each row of data structure 1100 may include information (e.g., a URL, a mouse position, at least one form field value, etc.) corresponding to a respective time (e.g., in the left-most column). In one embodiment, the time may be determined from a host machine time of a computer system executing process 700 and/or executing the web browser (e.g., used to display the webpage in step 710). The information (e.g., in the second column from the left) may include a URL associated with a webpage (e.g., the webpage displayed in step 710, webpage 900, webpage 1000, etc.) and/or at least one URL-resident argument (e.g., a session state or other parameter encoded or otherwise included in a URL).

In one embodiment, the information (e.g., in the second column from the right) of data structure 1100 may include a position of a cursor (e.g., 950 of FIG. 9, 1050 of FIG. 10, etc.), where the cursor may be an image displayed on a display device which can be controlled by a user via a user interface component (e.g., a keyboard, a mouse, a trackball, a joystick, a pen, a voice input device, a touch input device, etc.). In one embodiment, the position may be defined in terms of a tag of the webpage which the cursor overlaps or is disposed within at a particular time, where the tag may be a frame tag (e.g., corresponding to frame 910 of webpage 900, frame 920 of webpage 900, frame 930 of webpage 900, frame 940 of webpage 900, frame 910 of webpage 900, etc.), a heading tag, a paragraph tag, a division or section tag, a table tag, a form tag, an ordered list tag, an unordered list tag, an image tag, a tag of a form field such as a text box, a text area box, a drop-down list box, a radio button, a checkbox, etc. For example, the cursor position corresponding to the first row of data structure 900 may be a top frame of a webpage (e.g., frame 910 of webpage 900) and/or a text box associated with a search feature of a webpage (e.g., within region 912 of webpage 900). As another example, the position of cursor 950 of FIG. 9 may be defined as overlapping or within frame 930, region 933, a form field within region 933, etc.

In one embodiment, the position may be defined in terms of an offset (e.g., a number of pixels, a distance, a percentage of a viewport or window of a web browser, etc.) from an origin. For example, the cursor position corresponding to the first row of data structure 900 may be 40 units in the "x" direction and 10 units in the "y" direction from an origin (e.g., a corner of a viewport or window of a web browser used to display the webpage, another point associated with a viewport or window of a web browser used to display the webpage, etc.). As another example, the position of cursor 950 of FIG. 9 may be defined as a first number of units to the right of point 960 and/or a second number of units below point 960.

As shown in FIG. 11, the information (e.g., in the rightmost column) of data structure 1100 may include a state of a form field (e.g., a text box, text area box, drop-down list box, radio button, check box, etc.) of a webpage (e.g., 900, 1000, another webpage, etc.). In one embodiment, data structure 1100 may include information (e.g., at least one letter, at least one number, at least one symbol, at least one other type of character, some combination thereof, etc.) entered in a text box and/or text area box at a particular time. Data structure 1100 may include at least one selected item of a drop-down list box at a particular time in one embodiment. And in one embodiment, data structure 1100 may include a checked state and/or unchecked state of a radio button and/or checkbox at a particular time.

In one embodiment, data may be tracked over time in step 720 using data structure 1100. For example, first data (e.g., a URL of a webpage, a position of a cursor, a state of a form field, etc.) may be sampled at a first time, and second data (e.g., a URL of a webpage, a position of a cursor, a state of a form field, etc.) may be sampled at a second time. The data may be sampled at periodic intervals in step 720 in one embodiment.

In one embodiment, the data (e.g., of data structure 1100) may include a duration associated with at least one other parameter (e.g., a cursor position, form field state, etc.). For example, if a cursor remains in a position and/or if a form field remains in the same state for a period of time, the data may indicate the duration that the cursor was in the same position and/or the form field was in the same state. In this manner, the data of data structure 1100 may be advantageously compacted by combining entries (e.g., with the same cursor position, the same form field state, etc.) and associating the combined entries with a duration.

Although FIG. 11 depicts data structure 1100 with a certain number of elements (e.g., rows, columns, types of data, etc.), it should be appreciated that data structure 1100 may have a different number of elements in other embodiments. For example, data structure 1100 may include data sampled at different times, at intervals (e.g., every 100 milliseconds, every second, every minute, etc.), etc. Additionally, although FIG. 11 depicts data structure 1100 with a certain arrangement of elements (e.g., rows, columns, types of data, etc.), it should be appreciated that data structure 1100 may have a different arrangement of elements in other embodiments.

Turning back to FIG. 7, step 730 involves analyzing the data (e.g., monitored and/or stored in step 720) to determine other data associated with navigation of the webpage (e.g., displayed in step 710). The analyzing may involve applying at least one rule (e.g., stored in rule database 860) to the data (e.g., monitored and/or stored in step 720) to determine the other data. In one embodiment, the at least one rule may specify a result or consequence (e.g., the other data) if a condition is met, where the data (e.g., monitored and/or stored in step 720) may be used to determine whether or not the condition is met.

For example, if it is determined (e.g., based on the data monitored and/or stored in step 720) in step 730 that the cursor is in the same position and/or region for a duration which exceeds a predetermined threshold, then it may be further determined (e.g., by applying a rule from rule database 860) that a user of the web browser needs assistance. As another example, if it is determined (e.g., based on the data monitored and/or stored in step 720) in step 730 that the cursor was in the same position more than a predetermined number of times (e.g., indicating that the user has repeatedly come back to the same content, portion of the webpage, etc.), then it may be further determined (e.g., by applying a rule from rule database 860) that a user of the web browser needs assistance. And as a further example, if it is determined (e.g., based on the data monitored and/or stored in step 720) in step 730 that the cursor overlaps content associated with customer service (e.g., a customer service link within frame 1020 of webpage 1000, etc.) or other information related to assisting the user, then it may be further determined (e.g., by applying a rule from rule database 860) that the user needs assistance.

And another example, if it is determined (e.g., based on the data monitored and/or stored in step 720) in step 730 that an entry in a form field is incorrect and/or incomplete (e.g., by comparing information entered using a form field to data which is expected, known to be correct, known to be possible, known to be complete, etc.), then it may be further determined (e.g., by applying a rule from rule database 860) that the user needs assistance (e.g., a suggestion or other information to help the user correct the information entered in the form field). As yet another example, if it is determined (e.g., based on the data monitored and/or stored in step 720) in step 730 that the cursor is positioned over similar content or products (e.g., overlapping regions 932 and 934 of webpage 900 where Product A and Product B are similar), then it may be further determined (e.g., by applying a rule from rule database 860) that the user needs assistance (e.g., related to determining which product and/or model best suits the user's needs).

As a further example, if it is determined (e.g., based on the data monitored and/or stored in step 720) in step 730 that the cursor is positioned out of the viewport or window of the web browser (e.g., not overlapping the web browser), then it may be further determined (e.g., by applying a rule from rule database 860) that the user's focus is shifting away from the webpage and/or that the user is contemporaneously performing another task (e.g., browsing another webpage displayed in another viewport or window). In one embodiment, step 730 may further involve analyzing events leading up to the movement of the cursor out of the out of the viewport or window of the web browser to determine what caused the user's focus to shift elsewhere and/or what task the user is contemporaneously performing.

In one embodiment, analysis performed in step 730 may include determining changes in data (e.g., monitored and/or stored in step 720) from one time to another time. For example, if a text box includes a five-letter word at one time but later includes only the first four letters of the five-letter word, then it may be determined (e.g., in step 730) that a user has deleted the last letter of the five-letter word. As another example, if a quantity of "2" items is displayed in region 1052 at a first time but later displays a quantity of "1" item, then it may be determined (e.g., in step 730) that a user has decreased the quantity of Product A (e.g., corresponding to region 1010) in the user's cart.

As shown in FIG. 7, step 740 involves performing at least one operation based on the other data (e.g., determined in step 730). In one embodiment, step 740 may involve guiding or otherwise providing assistance to a user (e.g., based on the other data in step 730 indicating that a user needs assistance). In one embodiment, step 740 may involve initiating a co-browsing session (e.g., performed in accordance with one or more steps of process 600), sending an electronic mail message to the user (e.g., of the webpage displayed in step 710), initiating a telephone communication with the user (e.g., of the webpage displayed in step 710), etc.

Figure 12:
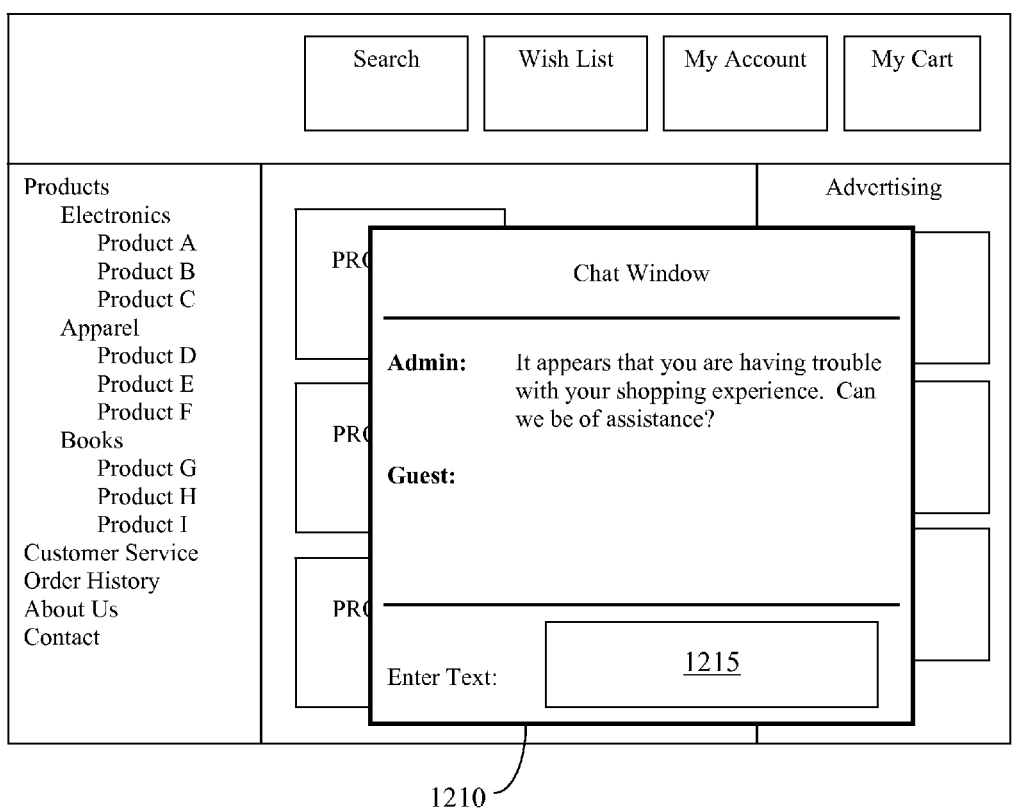
FIG. 12 shows an on-screen webpage altered by displaying a communication interface in accordance with one embodiment of the present invention.
Figure 15:
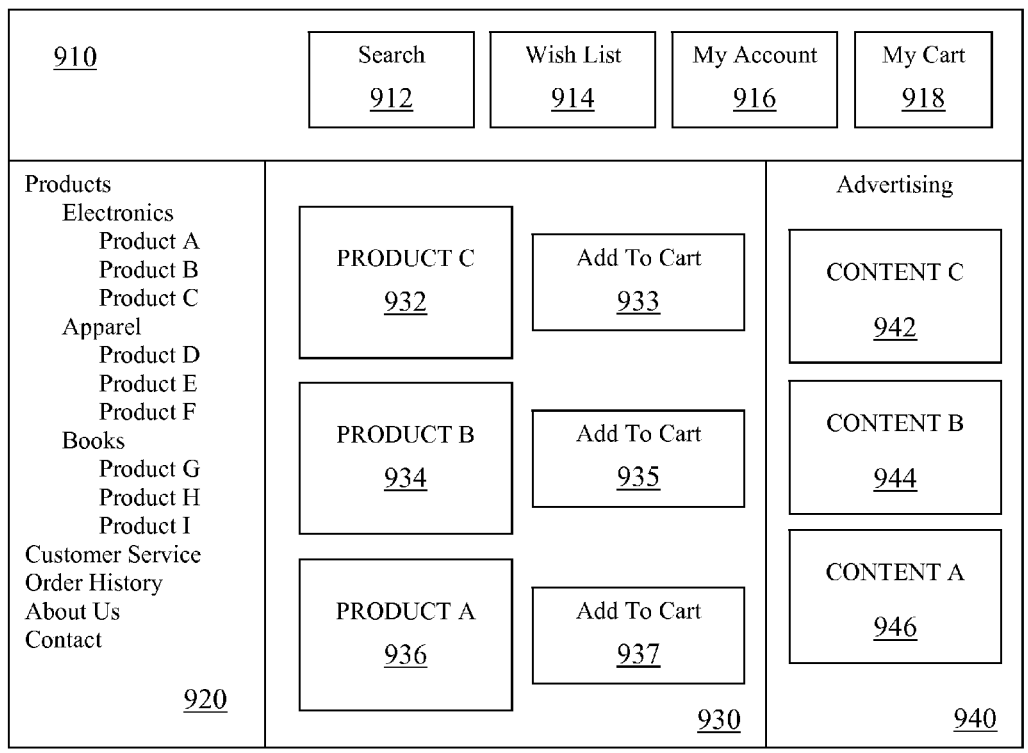
FIG. 15 shows an on-screen webpage altered by rearranging content thereof in accordance with one embodiment of the present invention.

In one embodiment, step 740 may involve altering the display of the webpage (e.g., 900, 1000, another webpage, etc.) within the web browser. For example, a chat session may be initiated and/or a communication interface may be displayed (e.g., as shown in FIG. 12). As another example, a product suggestion may be displayed (e.g., as shown in FIG. 13). As a further example, the display of the webpage may be altered in step 740 by displaying a product suggestion based on an incompatibility between products in a user's cart (e.g., as shown in FIG. 14). And as yet another example, an arrangement of content on the webpage and/or a presentation thereof may be modified (e.g., as shown in FIG. 15) in step 740.

FIG. 12 shows on-screen webpage 900 altered by displaying a communication interface in accordance with one embodiment of the present invention. As shown in FIG. 12, communication interface 1210 may be displayed (e.g., in step 740) contemporaneously with the webpage, where communication interface 1210 may at least partially overlap the webpage. Communication interface 1210 may be displayed responsive to a determination that a user of the webpage needs assistance (e.g., as determined in step 730). In this manner, a user may communicate with an agent or other user (e.g., an administrator, customer service representative, etc.) to resolve problems or otherwise receive assistance.

In one embodiment, communication interface 1210 may include at least one form field. For example, communication interface 1210 may include form field 1215. Form field 1215 may include at least one text box, at least one text area box, at least one drop-down list box, at least one radio button, at least one check box, etc.

Although FIG. 12 depicts webpage 900 with a certain number and arrangement of elements, it should be appreciated that webpage 900 may have a different number and/or arrangement of elements in other embodiments. Additionally, although FIG. 12 depicts elements of webpage 900 with a certain size and shape, it should be appreciated that elements of webpage 900 may be a different size and/or shape in other embodiments. Additionally, although FIG. 12 depicts communication interface 1210 overlapping webpage 900, it should be appreciated that communication interface 1210 may be displayed over and/or contemporaneously with any webpage (e.g., 1000, another webpage, etc.).

FIG. 13 shows on-screen webpage 1000 altered by displaying a product suggestion in accordance with one embodiment of the present invention. As shown in FIG. 13, window 1310 may be displayed (e.g., in step 740) contemporaneously with the webpage, where window 1310 may at least partially overlap the webpage. In one embodiment, window 1310 may suggest one or more products related to one or more other products in a user's cart (e.g., displayed as part of webpage 1000), where the one or more related products may be determined in step 730. A user interaction with a region of 1310 (e.g., corresponding to a particular product of the one or more other products) may automatically add the particular product to the user's cart and/or display additional information about the particular product. And in one embodiment, window 1310 may be displayed responsive to a determination that a user of the webpage needs assistance (e.g., as determined in step 730).

Although FIG. 13 depicts webpage 1000 with a certain number and arrangement of elements, it should be appreciated that webpage 1000 may have a different number and/or arrangement of elements in other embodiments. Additionally, although FIG. 13 depicts elements of webpage 1000 with a certain size and shape, it should be appreciated that elements of webpage 1000 may be a different size and/or shape in other embodiments. Additionally, although FIG. 13 depicts window 1310 overlapping webpage 1000, it should be appreciated that window 1310 may be displayed over and/or contemporaneously with any webpage (e.g., 900, another webpage, etc.).

FIG. 14 shows on-screen webpage 1000 altered by displaying a product suggestion based on an incompatibility between products in a user's cart in accordance with one embodiment of the present invention. As shown in FIG. 14, window 1410 may be displayed (e.g., in step 740) contemporaneously with the webpage, where window 1410 may at least partially overlap the webpage. In one embodiment, window 1410 may suggest one or more products which can be used in place of or as alternatives to one or more other products in a user's cart (e.g., displayed as part of webpage 1000), where the one or more products may be determined in step 730 based on a conflict or incompatibility between two or more products in the user's cart. A user interaction with region 1415 (e.g., corresponding to the one or more alternative products) may automatically add the one or more products to the user's cart (e.g., in lieu of the one or more other products which may be automatically removed from the user's cart) and/or display additional information about the one or more products.

Although FIG. 14 depicts webpage 1000 with a certain number and arrangement of elements, it should be appreciated that webpage 1000 may have a different number and/or arrangement of elements in other embodiments. Additionally, although FIG. 14 depicts elements of webpage 1000 with a certain size and shape, it should be appreciated that elements of webpage 1000 may be a different size and/or shape in other embodiments. Additionally, although FIG. 14 depicts window 1410 overlapping webpage 1000, it should be appreciated that window 1410 may be displayed over and/or contemporaneously with any webpage (e.g., 900, another webpage, etc.).

FIG. 15 shows on-screen webpage 900 altered by rearranging content thereof in accordance with one embodiment of the present invention. As shown in FIG. 15, the association of regions 932 and 933 has been changed from Product A (e.g., as shown and described with respect to FIG. 9) to Product C. For example, region 932 as shown in FIG. 15 may be associated with Product C and/or an interaction with region 933 as shown in FIG. 15 may enable Product C to be placed in a user's cart. Additionally, the association of regions 936 and 937 has been changed from Product C (e.g., as shown and described with respect to FIG. 9) to Product A. For example, region 936 as shown in FIG. 15 may be associated with Product A and/or an interaction with region 937 as shown in FIG. 15 may enable Product A to be placed in a user's cart.

In one embodiment, content may be rearranged on a webpage (e.g., in step 740) responsive to a determining (e.g., in step 730) that a user has missed certain content, has not interacted with certain content, etc. For example, if a cursor (e.g., 950) is rarely or never positioned over particular content (e.g., Content A within region 942 as shown in FIG. 9), the content may be repositioned on the webpage (e.g., displayed within region 946 as shown in FIG. 15) to make it more visible or otherwise encourage the user to view and/or interact with the content. In one embodiment, content may be displayed at or repositioned to a region of the webpage which the cursor is more frequently positioned at or in (e.g., as determined from data monitored and/or stored in step 720).

In one embodiment, the content of the webpage (e.g., 900, another webpage, etc.) may be rearranged by overlapping content of the webpage with other content. For example, content associated with Product A in region 932 may be overlapped with content associated with Product C. The content may be overlaid using a computer system (e.g., 120) which is separate from the web server (e.g., 110) in one embodiment. As such, in one embodiment, the display of the webpage may be altered without modifying the webpage itself (e.g., as provided by the web server).

In one embodiment, the content of the webpage (e.g., 900, another webpage, etc.) may be rearranged by modifying content of the webpage itself. For example, content associated with Product A in region 932 may be replaced by content associated with Product C. The content may be replaced or otherwise modified by the web server (e.g., 110) which provides the webpage in one embodiment. As such, in one embodiment, the display of the webpage may be altered by modifying the webpage itself (e.g., as provided by the web server).

Although FIG. 15 depicts webpage 900 with a certain number and arrangement of elements, it should be appreciated that webpage 900 may have a different number and/or arrangement of elements in other embodiments. Additionally, although FIG. 15 depicts elements of webpage 900 with a certain size and shape, it should be appreciated that elements of webpage 900 may be a different size and/or shape in other embodiments.

Turning back to FIG. 7, step 730 may involve determining if an amount (e.g., a subtotal displayed in region 1072, a total displayed in region 1078, etc.) associated with a shopping cart exceeds a predetermined threshold in one embodiment. If so, then at least one additional operation may be performed in step 740 (e.g., a later follow-up with the user via a mail campaign, via electronic mail message, etc.) to ask the user whether they are interested in at least one other product (e.g., not contained within a user's cart and/or not purchased as a result of a session associated with a user's cart).

In one embodiment, step 730 may involve determining if one or more items in a user's cart (e.g., displayed as part of webpage 1000) are not purchased and/or if the cart is abandoned (e.g., by a user not checking out and purchasing at least one item in the cart). If so, then the one or more items may be automatically placed on a user's wish list in step 740 and/or offered to the user at a later visit to the webpage in step 740.

In one embodiment, steps 730 and/or 740 may be performed by a component of a computer system used to perform step 710 and/or 720. For example, data may be analyzed in step 730 and/or at least one operation may be performed in step 740 by a component executed by the computer system running the web browser used to display the webpage in step 710 and/or monitor data associated with navigation of the webpage in step 720, where the component may be plug-in to the web browser (e.g., 122, 132, etc.), an application separate from the web browser, etc. The plug-in may be persistent and/or stored on the computer system (e.g., 120, 130, etc.) after download (e.g., for future use such that the plug-in need not be re-downloaded to the computer system). In this manner, user interactions with a webpage may be analyzed and/or operations may be performed in response thereto even where the user interactions do not initiate or are not otherwise associated with a communication with a web server (e.g., 110).

In one embodiment, one or more steps of process 700 may be performed in the context of a co-browsing session (e.g., performed in accordance with process 600) between a plurality of computer systems (e.g., 120, 130, etc.). For example, step 710 may involve displaying a webpage on a plurality of computer systems participating in a co-browsing session. Step 720 may involve monitoring data associated with navigation of a webpage (e.g., displayed on the plurality of computer systems participating in the co-browsing session), where the navigation (e.g., movements of the cursor, inputs associated with at least one form field, etc.) may be associated with user interactions input using the plurality of computer systems participating in the co-browsing session (e.g., movements of the cursor by a plurality of users located remotely from one another, inputs associated with at least one form field by a plurality of users located remotely from one another, etc.).

Step 730 may involve analyzing the data to determine other data associated with navigation of the webpage (e.g., by the plurality of computer systems participating in the co-browsing session). Step 740 may involve performing at least one operation based on the other data, where the at least one operation may be performed with respect to the plurality of computer systems participating in the co-browsing session (e.g., a respective webpage displayed on each computer system of the plurality of computer systems participating in the co-browsing session may be altered in the same way, sending a respective electronic mail message to each user participating in the co-browsing session, initiating a respective telephone communication with each user participating in the co-browsing session, etc.).

Although FIG. 7 shows process 700 with a specific number and ordering of steps, it should be appreciated that process 700 may have a different number and/or ordering of steps in other embodiments. Although FIG. 8 shows system 800 with a specific number and arrangement of components, it should be appreciated that system 800 may include a different number and/or arrangement of components in other embodiments. For example, data storage 850 and/or rules database 860 may be included within or otherwise be part of at least one computer system (e.g., 120, 130, etc.).

Figure 16:
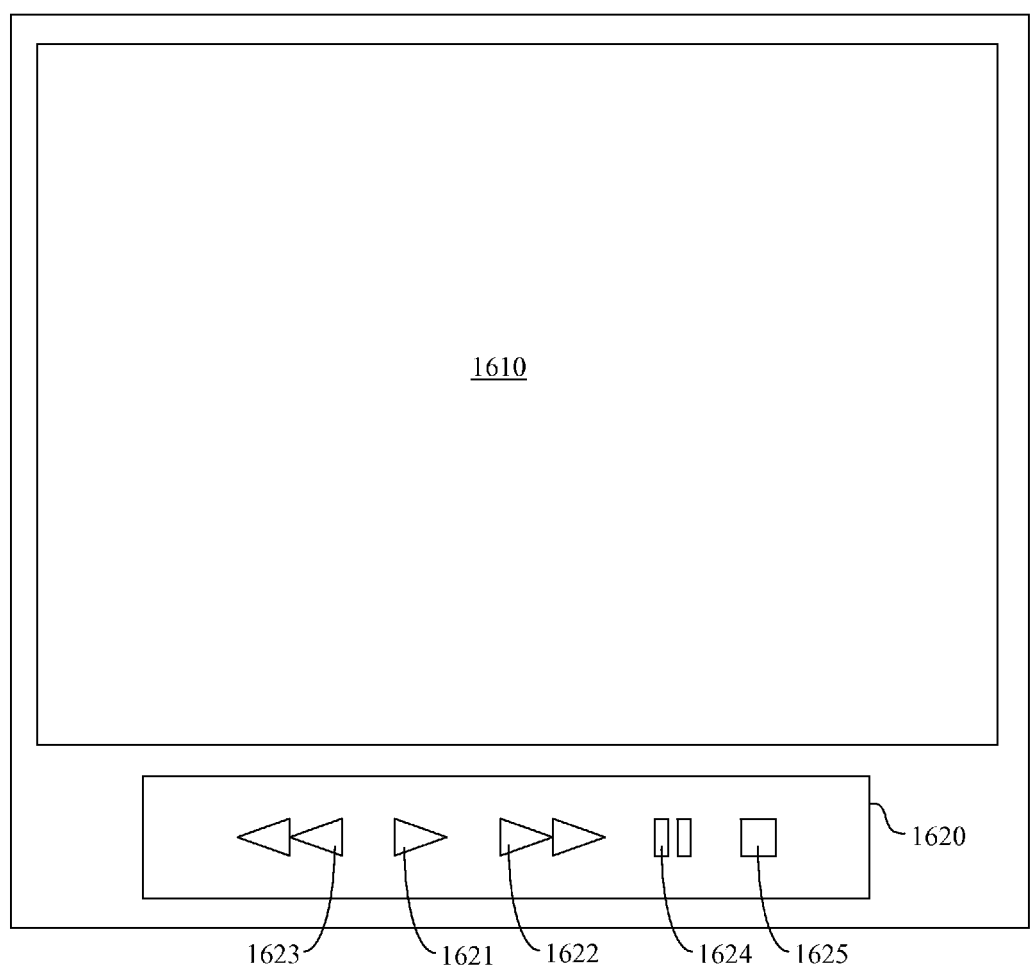
FIG. 16 shows an exemplary user interface for replaying a webpage navigation session in accordance with one embodiment of the present invention.

FIG. 16 shows exemplary on-screen user interface 1600 for replaying a webpage navigation session in accordance with one embodiment of the present invention. As shown in FIG. 16, user interface 1600 includes region 1610 for displaying content being replayed or recalled. In one embodiment, content displayed in region 1610 may be similar or identical to that displayed in the window or viewport of the web browser that was originally used to display the webpage. The content may include one or more frames of data, where the frames may be replayed in succession to show a video. In this manner, the replay of the navigation session may show movement of the cursor, entry and/or deletion of information in form fields, selections entered using form fields, etc.

In one embodiment, data associated with navigation of the webpage may be used to generate content for the replay of the webpage navigation session. For example, data associated with each time or timestamp (e.g., from the leftmost column in data structure 1100) may be used to create a respective frame or image to be displayed during the replay of content. Each frame or image may include content from a webpage identified using a URL (e.g., from the second column from the left of data structure 1100), where the webpage content may be accessed from the web server (e.g., 110) providing the webpage. Each frame or image may include a cursor displayed contemporaneously with the webpage content at a respective position (e.g., from the third column from the left of data structure 1100). Additionally, each frame or image may include information associated with one or more form fields displayed contemporaneously with the webpage content based on at least one state (e.g., from the rightmost column of data structure 1100).

An interaction with element 1621 may initiate a replay of a webpage navigation session in actual time (e.g., an amount of time elapsed in the actual webpage navigation session equals or approximately equals the amount of time elapsed in the replay of the webpage navigation session). Element 1622 may be used to step forward or fast forward or replay the webpage navigation session (e.g., at a faster rate than that initiated using element 1621). An interaction with element 1623 may initiate a step backward or rewind of the webpage navigation session (e.g., in an order which is opposite from that associated with element 1621 and/or 1622). Element 1624 may be used to pause the replay of the webpage navigation session. Additionally, an interaction with element 1625 may stop the replay of the webpage navigation session.

In one embodiment, user interface 1600 may be displayed within a viewport or window on a display screen of a computer system (e.g., 120, 130, etc.), where the window or viewport may occupy the entire display area of the display screen or some portion thereof. User interface may be implemented using a web browser (e.g., 122, 132, etc.) in one embodiment.

Although FIG. 16 depicts user interface 1600 with a certain number and arrangement of elements, it should be appreciated that user interface 1600 may have a different number and/or arrangement of elements in other embodiments. Additionally, although FIG. 16 depicts elements of user interface 1600 with a certain size and shape, it should be appreciated that elements of user interface 1600 may be a different size and/or shape in other embodiments.

Figure 17:
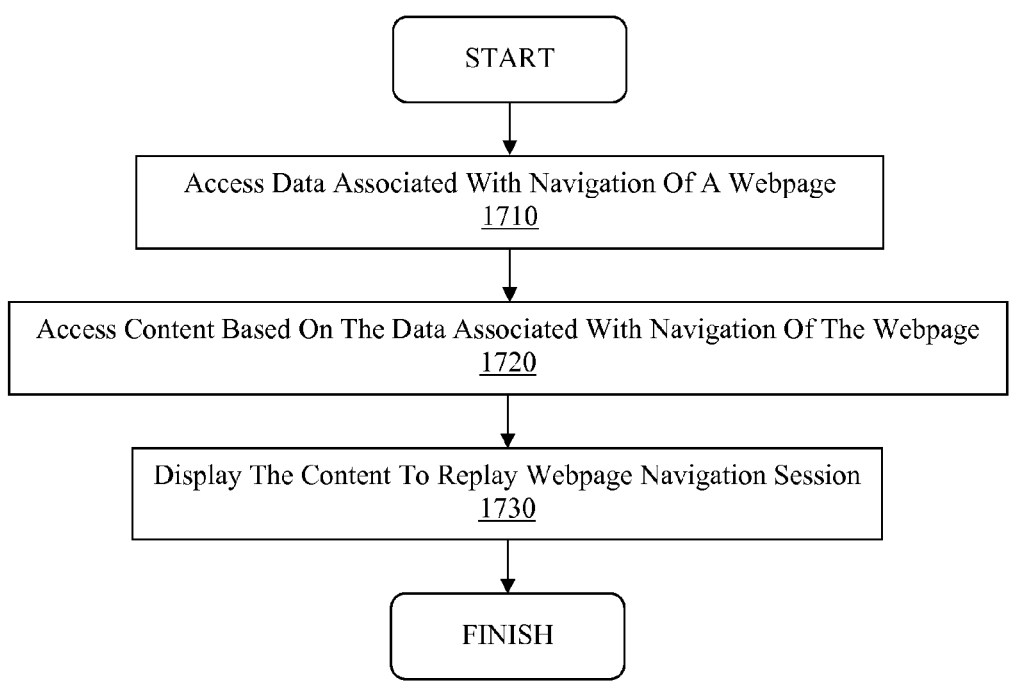
FIG. 17 shows a flowchart of a computer-implemented process for replaying a webpage navigation session in accordance with one embodiment of the present invention.

FIG. 17 shows a flowchart of computer-implemented process 1700 for replaying a webpage navigation session in accordance with one embodiment of the present invention. As shown in FIG. 17, step 1710 involves accessing data (e.g., stored in data storage 850, similar to data structure 1100, etc.) associated with navigation of a webpage (e.g., 900, 1000, another webpage, etc.). The data may include information (e.g., at least one URL, at least one URL-resident argument, at least one cursor position, at least one state of at least one form field, etc.), where each portion of the information may correspond to a respective time or time stamp.

Step 1720 involves accessing content based on the data associated with navigation of the webpage. For example, step 1720 may involve accessing content associated with navigation of the webpage, where the content associated with navigation of the webpage may include online content accessed from a web server based on data accessed in step 1710 (e.g., at least one URL, at least one URL-resident argument, etc.). As another example, step 1720 may involve accessing content for rendering a cursor (e.g., displayed at a position determined from the data accessed in step 1710), content for rendering text entered in a form field (e.g., determined from the data accessed in step 1710), content for rendering at least one selection indicated using a form field (e.g., determined from the data accessed in step 1710), some combination thereof, etc.

As shown in FIG. 17, step 1730 involves displaying the content (e.g., accessed in step 1720) to replay the webpage navigation session. In one embodiment, the content may be displayed in step 1730 in a region (e.g., 1610) of a user interface (e.g., 1600). The replay in step 1730 may be in forward order or reverse order. And in one embodiment, step 1730 may involve initiating, stopping, pausing, or otherwise altering the display of content based upon an interaction with an element (e.g., 1621, 1622, 1623, 1624, 1625, etc.) of a user interface (e.g., 1600). And in one embodiment, step 1730 may be performed by the same computer system used to perform other steps of process 1700 or a different computer system than that used to perform other steps of process 1700.

In one embodiment, one or more steps of process 1700 may be performed using a plug-in to a web browser (e.g., 122, 132, used to display the content in step 1730, etc.). The plug-in may be persistent and/or stored on the computer system (e.g., 120, 130, etc.) after download (e.g., for future use such that the plug-in need not be re-downloaded to the computer system). And in one embodiment, one or more steps of process 1700 may be performed using an application separate from a web browser (e.g., 122, 132, used to display the content in step 1730, etc.).

Although FIG. 17 shows process 1700 with a specific number of steps, it should be appreciated that process 700 may have a different number of steps in other embodiments. Additionally, although FIG. 17 shows process 1700 with a specific ordering of steps, it should be appreciated that process 700 may have a different ordering of steps in other embodiments.

Communication Associated with a Webpage

Figure 18:
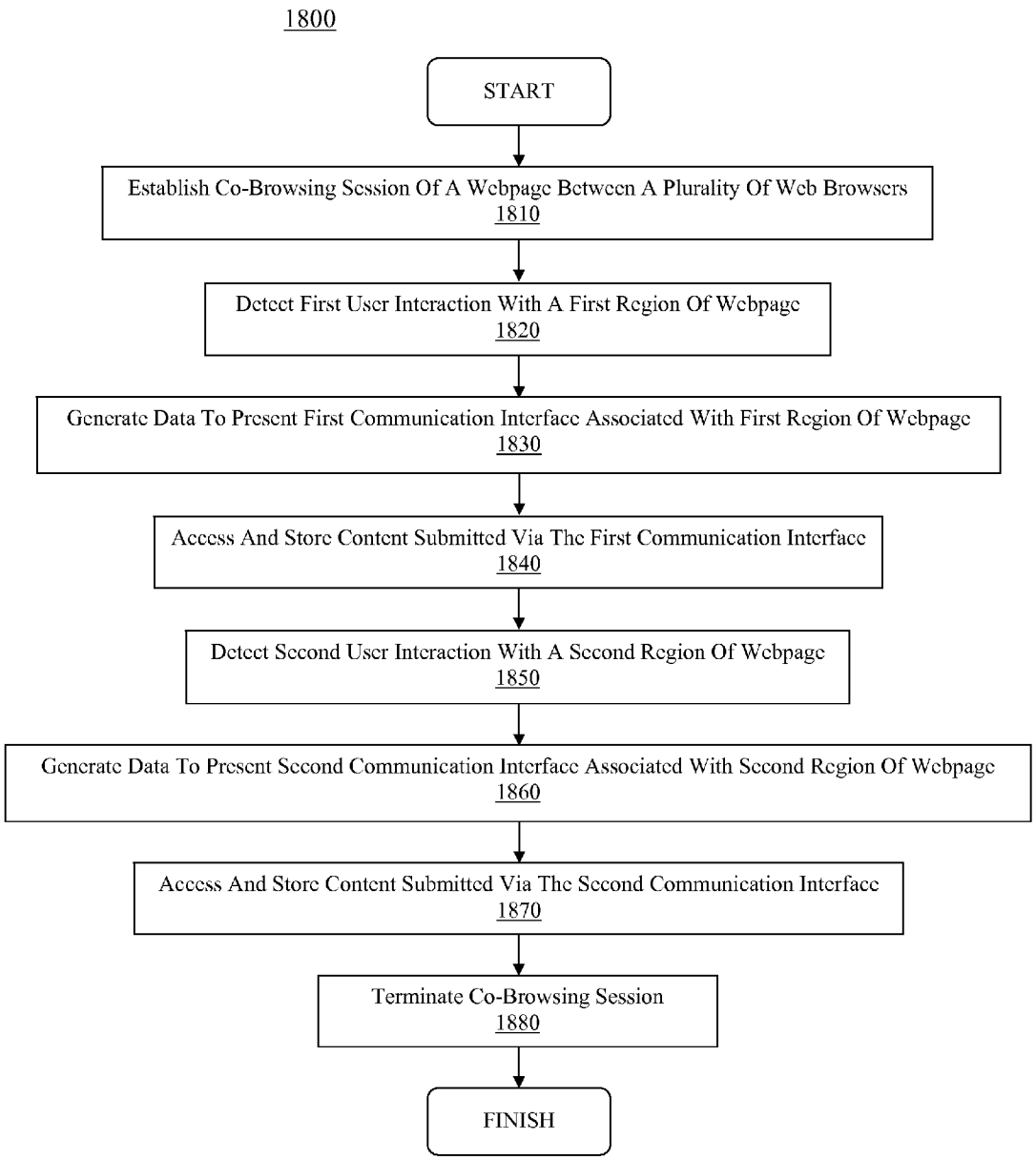
FIG. 18 shows a flowchart of a computer-implemented process for enabling communication associated with a webpage in accordance with one embodiment of the present invention.

FIG. 18 shows a flowchart of computer-implemented process 1800 for enabling communication associated with a webpage in accordance with one embodiment of the present invention. As shown in FIG. 18, step 1810 involves establishing a co-browsing session of a webpage (e.g., 900, 1000, etc.) between a plurality of web browsers. In one embodiment, each of the plurality of web browsers (e.g., 122, 132, etc.) may be executed by a plurality of computer systems (e.g., 120, 130, etc.) which are disposed remotely from one another. And in one embodiment, step 1810 may be performed similarly to and/or analogously to one or more steps of process 600.

Step 1820 involves detecting a first user interaction with a first region of the webpage. The first user interaction may be a mouse click while a cursor (e.g., 950) overlaps or is displayed in the first region of the webpage (e.g., region 932), an interaction with a region of a touch screen which corresponds to the first region of the webpage (e.g., region 932), etc. In one embodiment, the first region of the webpage (e.g., region 932) may be defined in terms of a position on the webpage (e.g., point 1915 as shown in FIGS. 19A-19D, etc.), a tag of the webpage (e.g., a frame tag, a heading tag, a paragraph tag, a division or section tag, a table tag, a form tag, an ordered list tag, an unordered list tag, an image tag, a tag of a form field such as a text box, a text area box, a drop-down list box, a radio button, a checkbox, etc.), an offset from an origin (e.g., point 960, another point corresponding to the viewport or window of a web browser, etc.), an element of the webpage (e.g., a frame, an image, a form field, etc.), some combination thereof, etc.

Figure 19A:
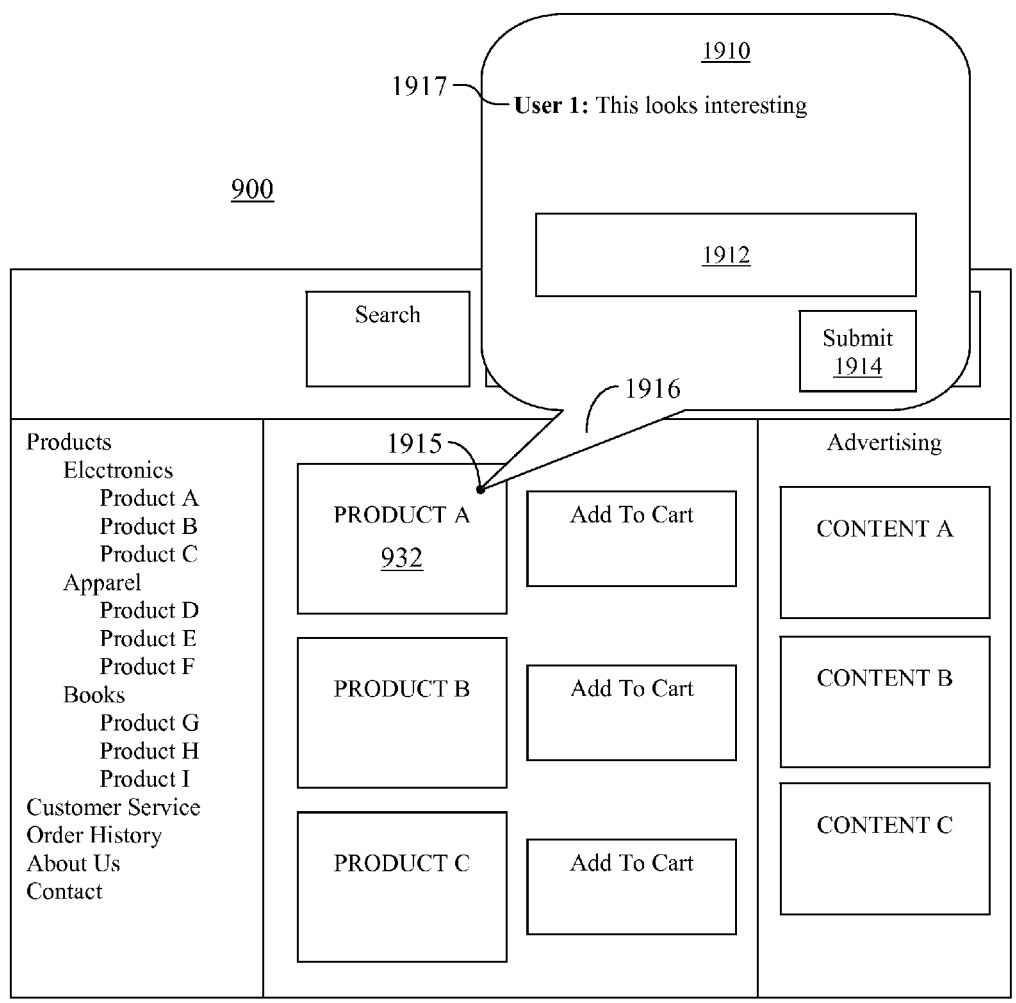
FIG. 19A shows an exemplary on-screen webpage including content associated with a region of the webpage in accordance with one embodiment of the present invention.
Figure 19B:
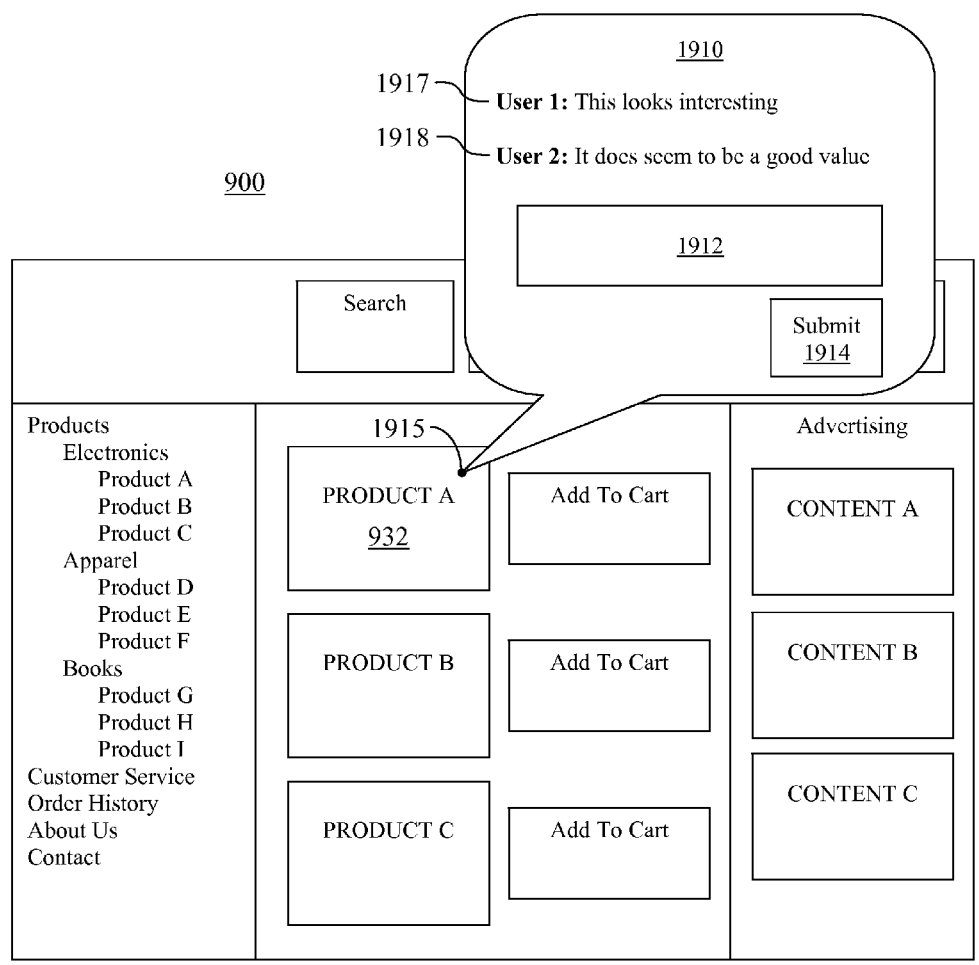
FIG. 19B shows an exemplary on-screen webpage including second content associated with a region of the webpage in accordance with one embodiment of the present invention.

As shown in FIG. 18, step 1830 involves generating data to present a first communication interface (e.g., 1910 as shown in FIGS. 19A-19D) associated with the first region of the webpage (e.g., region 932). As used herein, the term "communication interface" may be a visual interface (e.g., a chat window or other on-screen graphical user interface enabling users to exchange communications or otherwise submit content such as at least one image, video, text, etc.), an audio interface (e.g., enabling users to exchange communications or otherwise submit content such as voice or other sound), or another type of interface. For example, responsive to a first user interaction with the first region (e.g., at point 1915 or another position associated with the first region) in step 1820, communication interface 1910 may be presented (e.g., displayed on a display screen of a computer system such as computer system 120 and/or computer system 130, displayed on a plurality of computer systems participating in the co-browsing session using a respective web browser executed by each of the plurality of computer systems, etc.) based on the data generated in step 1830. The communication interface (e.g., 1910) may be displayed (e.g., based on the content generated in step 1830) in proximity to the first region, overlapping the first region, or otherwise displayed to indicate the association between the first communication interface and the first region (e.g., including element 1916 which points to the first region). And in one embodiment, the first communication interface may enable one or more participants in the co-browsing session (e.g., established in step 1810) to submit content (e.g., communication 1917 as shown in FIGS. 19A and 19B, communication 1918 as shown in FIG. 19B, etc.), where the content may be associated with the first region of the webpage.

In this manner, users can more readily and efficiently communicate about the first region of the webpage (e.g., without needing to refer to the region of the webpage, without needing to describe content or other elements of the first region of the webpage, etc.). For example, the word "this" in communication 1917 (e.g., shown in FIG. 19B) and/or the word "it" in communication 1918 (e.g., shown in FIG. 19B) may be used instead of the words "Product A" or a description of the product. Additionally, context for the content submitted via the first communication interface may be provided (e.g., by associating the content to the first region of the webpage). For example, it may be understood that the word "this" in communication 1917 (e.g., shown in FIG. 19B) and/or the word "it" in communication 1918 (e.g., shown in FIG. 19B) refer to "Product A" or other content associated with the first region (e.g., 932).

In one embodiment, the first communication interface (e.g., 1910) may include one or more elements enabling users to submit content. For example, information (e.g., text, images, symbols, other content, etc.) may be entered or otherwise submitted using region 1912, where region 1912 may include at least one form field (e.g., at least one text box, at least one text area box, at least one drop-down list box, at least one radio button, at least one check box, etc.) in one embodiment. Region 1914 may enable a user to send or initiate the communication of the information entered using region 1912. In one embodiment, content (e.g., communication 1917, communication 1918, content submitted using region 1912, etc.) may be displayed in the first communication interface (e.g., 1910) responsive to an interaction with region 1914.

Data may be generated in step 1830 to display communications in chronological order (e.g., of transmission, of receipt, etc.) in the first communication interface in one embodiment. For example, responsive to an interaction with region 932 (e.g., at point 1915 or another position associated with region 932) associated with Product A, a first user may enter communication 1917 (e.g., stating "[t]his looks interesting") which may be displayed in communication interface 1910 as shown in FIG. 19A. A second user may then enter communication 1918 (e.g., stating "[i]t does seem to be a good value") which may be displayed in communication interface 1910 as shown in FIG. 19B. Accordingly, communication 1918 may be displayed below communication 1917 since communication 1918 was sent and/or received after communication 1917.

Figure 20:
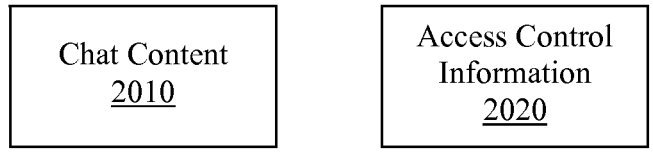
FIG. 20 shows an exemplary data storage in accordance with one embodiment of the present invention.

Step 1830 may involve generating data to contemporaneously display the first communication interface and the webpage (e.g., 900, another webpage including one or more regions associated with the first communication interface, etc.). In one embodiment, the first communication interface may be displayed using data (e.g., chat data 2010, or a portion thereof, as shown in FIG. 20) separate from content of the webpage (e.g., stored on or otherwise provided using web server 110), where the first communication interface (e.g., 1910) may overlap the content of the webpage (e.g., 900). In this case, the first communication interface may be displayed without modifying the webpage itself (e.g., as provided by web server 110). Additionally, in one embodiment, the data of the first communication interface (e.g., 1910) and the content of the webpage (e.g., 900) may be stored on separate servers or using separate computer systems, may be owned or managed by separate entities, etc. Alternatively, the first communication interface may be included within or otherwise displayed using content of the webpage (e.g., the webpage may be modified to accommodate or otherwise include the data of the first communication interface).

In one embodiment, step 1830 may involve generating data to display the first communication interface using animation. For example, the main portion (e.g., enabling the input of information) of the first communication interface (e.g., 1910) may be displayed first, followed by an element (e.g., 1916) that points to the first region. In one embodiment, the element that points to the first region may be animated such that it grows and extends from the main portion of the first communication interface.

As shown in FIG. 18, step 1840 involves accessing and storing content submitted via the first communication interface. In one embodiment, step 1840 may involve storing the content (e.g., as a data structure similar to data structure 2100 of FIG. 21, etc.) in a data storage (e.g., as part of chat data 2010 of data storage 850 as shown in FIG. 20). Alternatively, step 1840 may involve storing the content (e.g., as a data structure similar to data structure 2100 of FIG. 21, etc.) in a memory of computer system 120 and/or a memory of computer system 130. And in one embodiment, step 1840 may involve storing the content (e.g., as a data structure similar to data structure 2100 of FIG. 21, etc.) in another location.

FIG. 21 shows exemplary data structure 2100 including content associated with a webpage in accordance with one embodiment of the present invention. Data structure 2100 may include content accessed and stored in step 1840 in one embodiment. And in one embodiment, data structure 2100 may be stored or otherwise included in data storage 850 (e.g., as part of chat data 2010).

As shown in FIG. 21, each row of data structure 2100 may include information (e.g., a URL and/or URL-resident argument, a region of a webpage associated with at least one communication interface, data associated with at least one communication interface, etc.) corresponding to a respective time (e.g., in the left-most column). In one embodiment, the time may be determined from a host machine time of one or more computer systems executing process 1800 and/or executing one or more web browsers participating in a co-browsing session (e.g., of a webpage associated with one or more of the communication interfaces, established in step 1810, etc.). The information (e.g., in the second column from the left) may include a URL associated with a webpage (e.g., associated with the first interaction detected in step 1820, associated with the second interaction detected in step 1850, being displayed and/or co-browsed during the co-browsing session, etc.) and/or at least one URL-resident argument (e.g., a session state or other parameter encoded or otherwise included in a URL).

Figure 19C:
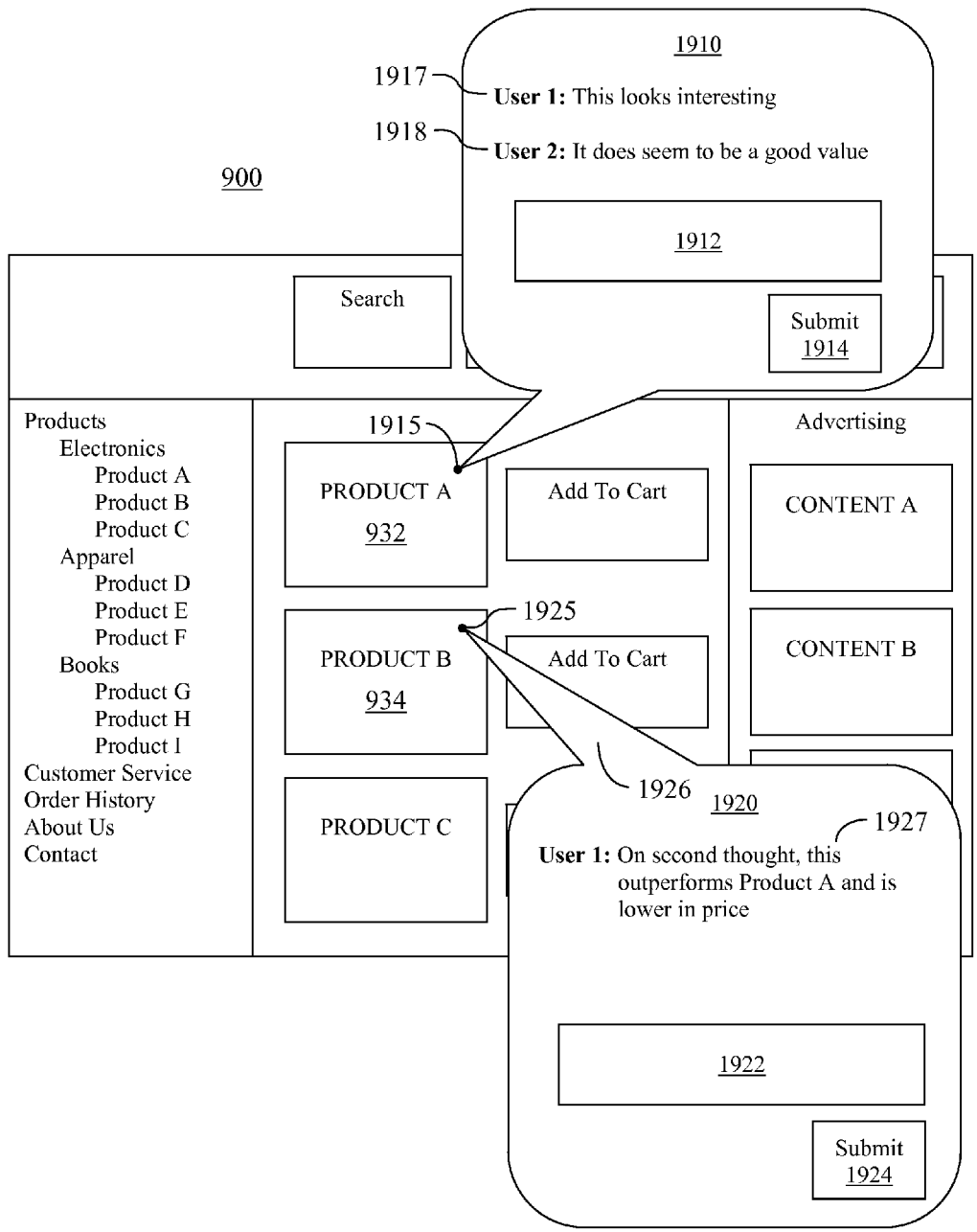
FIG. 19C shows an exemplary on-screen webpage including third content associated with a region of the webpage in accordance with one embodiment of the present invention.
Figure 19D:
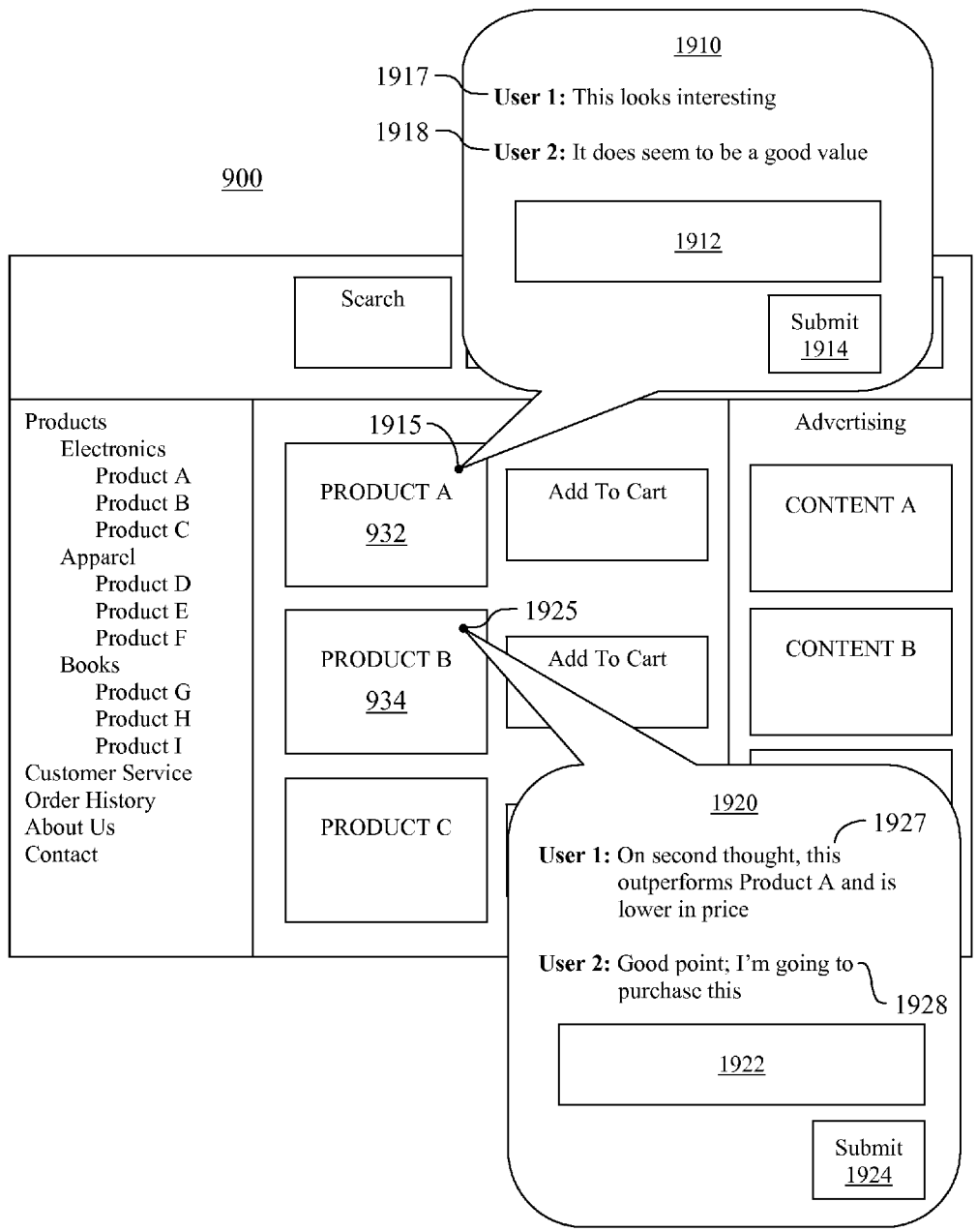
FIG. 19D shows an exemplary on-screen webpage including fourth content associated with a region of the webpage in accordance with one embodiment of the present invention.

In one embodiment, the information (e.g., in the second column from the right) of data structure 2100 may include a region (e.g., the first region associated with steps 1820-1840 of process 1800, the second region associated with steps 1850-1870 of process 1800, etc.) of a webpage (e.g., associated with a URL in the second column from the left of data structure 2100). The region may be defined in terms of a position on the webpage (e.g., point 1915 as shown in FIGS. 19A-19D, point 1925 as shown in FIGS. 19C and 19D, etc.), a tag of the webpage (e.g., a frame tag, a heading tag, a paragraph tag, a division or section tag, a table tag, a form tag, an ordered list tag, an unordered list tag, an image tag, a tag of a form field such as a text box, a text area box, a drop-down list box, a radio button, a checkbox, etc.), an offset from an origin (e.g., point 960, another point corresponding to the viewport or window of a web browser, etc.), an element of the webpage (e.g., a frame, an image, a form field, etc.), some combination thereof, etc.

As shown in FIG. 21, the information (e.g., in the right-most column) of data structure 2100 may include data associated with a communication interface. For example, the data may include an identification of at least one communication interface associated with a region in the second column from the right. As another example, the data may include at least one communication displayed in a communication interface and/or exchanged via a communication interface. And as a further example, the data may include the state of one or more form fields associated with a communication interface. And as yet another example, the data may include content (e.g., accessed and stored in step 1840, accessed and stored in step 1870, etc.) and/or a location at which the content (e.g., accessed and stored in step 1840, accessed and stored in step 1870, etc.) can be accessed, where the content may include at least one image, video, text, sound, some combination thereof, etc.

In one embodiment, data may be tracked over time (e.g., in steps 1840 of process 1800, in step 1870 of process 1800, etc.) using data structure 2100. For example, first data (e.g., a URL of a webpage, a URL-resident argument associated with a webpage, a region of a webpage, data associated with a communication interface, etc.) may be sampled at a first time, and second data (e.g., a URL of a webpage, a region of a webpage, data associated with a communication interface, etc.) may be sampled at a second time. The data may be sampled at periodic intervals (e.g., in steps 1840 of process 1800, in step 1870 of process 1800, etc.) in one embodiment.

In one embodiment, the data (e.g., of data structure 2100) may include a duration associated with at least one other parameter (e.g., a region of a webpage, data associated with a communication interface, etc.). For example, if a parameter remains the same for a period of time, the data may indicate the duration that the parameter remains the same. In this manner, the data of data structure 2100 may be advantageously compacted by combining entries (e.g., with the same region of a webpage, the same data associated with a communication interface, etc.) and associating the combined entries with a duration.

Although FIG. 21 depicts data structure 2100 with a certain number of elements (e.g., rows, columns, types of data, etc.), it should be appreciated that data structure 2100 may have a different number of elements in other embodiments. For example, data structure 2100 may include data sampled at different times, at intervals (e.g., every 100 milliseconds, every second, every minute, etc.), etc. Additionally, although FIG. 21 depicts data structure 2100 with a certain arrangement of elements (e.g., rows, columns, types of data, etc.), it should be appreciated that data structure 2100 may have a different arrangement of elements in other embodiments.

Turning back to FIG. 18, step 1850 involves detecting a second user interaction with a second region of the webpage. The second user interaction may be a mouse click while a cursor (e.g., 950) overlaps or is displayed in the second region of the webpage (e.g., region 934), an interaction with a region of a touch screen which corresponds to the second region of the webpage (e.g., region 934), etc. In one embodiment, the second region of the webpage (e.g., region 934) may be defined in terms of a position on the webpage (e.g., point 1925 as shown in FIGS. 19C and 19D, etc.), a tag of the webpage (e.g., a frame tag, a heading tag, a paragraph tag, a division or section tag, a table tag, a form tag, an ordered list tag, an unordered list tag, an image tag, a tag of a form field such as a text box, a text area box, a drop-down list box, a radio button, a checkbox, etc.), an offset from an origin (e.g., point 960, another point corresponding to the viewport or window of a web browser, etc.), an element of the webpage (e.g., a frame, an image, a form field, etc.), some combination thereof, etc.

Step 1860 involves generating data to present a second communication interface (e.g., 1920 as shown in FIGS. 19C-19D) associated with the second region of the webpage (e.g., region 934). For example, responsive to a second user interaction with the second region (e.g., at point 1925 or another position associated with the second region) in step 1850, communication interface 1920 may be presented (e.g., displayed on a display screen of a computer system such as computer system 120 and/or computer system 130, displayed on a plurality of computer systems participating in the co-browsing session using a respective web browser executed by each of the plurality of computer systems, etc.) based on the data generated in step 1860. The communication interface (e.g., 1920) may be displayed (e.g., based on content generated in step 1860) in proximity to the second region, overlapping the second region, or otherwise displayed to indicate the association between the second communication interface and the second region (e.g., including element 1926 which points to the second region). And in one embodiment, the second communication interface may enable one or more participants in the co-browsing session to submit content (e.g., communication 1927 as shown in FIGS. 19C and 19D, communication 1928 as shown in FIG. 19D, etc.), where the content may be associated with the second region of the webpage.

In this manner, users can more readily and efficiently communicate about the second region of the webpage (e.g., without needing to refer to the region of the webpage, without needing to describe content or other elements of the second region of the webpage, etc.). For example, the word "this" in communication 1927 (e.g., shown in FIG. 19C) and communication 1928 (e.g., shown in FIG. 19D) may be used instead of the word "Product B" or a description of the product. Additionally, context for the content submitted via the second communication interface may be provided (e.g., by associating the content to the second region of the webpage). For example, it may be understood that the word "this" in communication 1927 (e.g., shown in FIG. 19C) and communication 1928 (e.g., shown in FIG. 19D) refer to "Product B" or other content associated with the second region (e.g., 934).

In one embodiment, the second communication interface (e.g., 1920) may include one or more elements enabling users to submit content. For example, information (e.g., text, images, symbols, other content, etc.) may be entered or otherwise submitted using region 1922, where region 1922 may include at least one form field (e.g., at least one text box, at least one text area box, at least one drop-down list box, at least one radio button, at least one check box, etc.) in one embodiment. Region 1924 may enable a user to send or initiate the communication of the information entered using region 1922. In one embodiment, content (e.g., communication 1927, communication 1928, content submitted using region 1922, etc.) may be displayed in the second communication interface (e.g., 1920) responsive to an interaction with region 1924.

Data may be generated in step 1860 to display communications in chronological order (e.g., of transmission, of receipt, etc.) in the second communication interface in one embodiment. For example, responsive to an interaction with region 934 (e.g., at point 1925 or another position associated with region 934) associated with Product B, a first user may enter communication 1927 (e.g., stating "[o]n second thought, this outperforms Product A and is lower in price") which may be displayed in communication interface 1920 as shown in FIG. 19C. A second user may then enter communication 1928 (e.g., stating "[g]ood point; I'm going to purchase this") which may be displayed in communication interface 1920 as shown in FIG. 19D. Accordingly, communication 1928 may be displayed below communication 1927 since communication 1928 was sent and/or received after communication 1927.

Step 1860 may involve generating data to contemporaneously display the second communication interface and the webpage (e.g., 900, another webpage including one or more regions associated with the second communication interface, etc.). In one embodiment, the second communication interface may be displayed using data (e.g., chat data 2010, or a portion thereof, as shown in FIG. 20) separate from content of the webpage (e.g., stored on or otherwise provided using web server 110), where the second communication interface (e.g., 1920) may overlap the content of the webpage (e.g., 900). In this case, the second communication interface may be displayed without modifying the webpage itself (e.g., as provided by web server 110). Additionally, in one embodiment, the data of the second communication interface (e.g., 1910) and the content of the webpage (e.g., 900) may be stored on separate servers or using separate computer systems, may be owned or managed by separate entities, etc. Alternatively, the second communication interface may be included within or otherwise displayed using content of the webpage (e.g., the webpage may be modified to accommodate or otherwise include the data of the second communication interface).

In one embodiment, step 1860 may involve generating data to display the second communication interface using animation. For example, the main portion (e.g., enabling the input of information) of the second communication interface (e.g., 1920) may be displayed first, followed by an element (e.g., 1926) that points to the second region. In one embodiment, the element that points to the second region may be animated such that it grows and extends from the main portion of the second communication interface.

In one embodiment, step 1860 may further involve generating data to modify the display of the first communication interface (e.g., by not displaying, hiding, graying out, fading out, etc.), where the display of the second communication interface may occur contemporaneously or sequentially with the modification of the display of the first communication interface. In one embodiment, the modification of the display of the first communication interface may be performed based on a user preference (e.g., a maximum number of communication interfaces that can be displayed contemporaneously), based on a user interaction with a web browser (e.g., a scrolling of the webpage such that at least a portion of the first region is no longer visible in the viewport or window of the web browser), etc.

As shown in FIG. 18, step 1870 involves accessing and storing content submitted via the second communication interface. In one embodiment, step 1870 may involve storing the content (e.g., as a data structure similar to data structure 2100 of FIG. 21, etc.) in a data storage (e.g., as part of chat data 2010 of data storage 850 as shown in FIG. 20). Alternatively, step 1870 may involve storing the content (e.g., as a data structure similar to data structure 2100 of FIG. 21, etc.) in a memory of computer system 120 and/or a memory of computer system 130. And in one embodiment, step 1870 may involve storing the content (e.g., as a data structure similar to data structure 2100 of FIG. 21, etc.) in another location.

Step 1880 involves terminating the co-browsing session (e.g., established in step 1810). In one embodiment, step 1880 may be performed similarly to and/or analogously to step 697 of process 600.

In one embodiment, one or more steps of process 1800 may be performed by at least one component of at least one computer system (e.g., 120, 130, etc.), where the at least one component may be a plug-in to the at least one web browser (e.g., 122, 132, etc.), an application separate from the at least one web browser, etc. The plug-in may be persistent and/or stored on the computer system (e.g., 120, 130, etc.) after download (e.g., for future use such that the plug-in need not be re-downloaded to the computer system).

For example, an interaction with a region of the webpage may be detected (e.g., in step 1820, step 1850, etc.) by at least one component executed by at least one computer system (e.g., 120, 130, etc.). As another example, a communication interface may be presented (e.g., using data generated in step 1830, using data generated in step 1860, etc.) by at least one component executed by at least one computer system (e.g., 120, 130, etc.). As a further example, content submitted via a communication interface may be accessed and stored (e.g., in step 1840, step 1870, etc.) by at least one component executed by at least one computer system (e.g., 120, 130, etc.). As such, in one embodiment, content may be submitted without communicating with a web server (e.g., 110), without the web server being "aware" of the submission or communication of the content, using a server or computer system (e.g., used to implement data storage 850, etc.) separate from the web server, some combination thereof, etc.

In one embodiment, one or more steps of process 1800 may be performed independently of the web server (e.g., 110, hosting and/or providing the webpage associated with a communication interface, etc.). For example, content may be submitted (e.g., for access by at least one other user) and/or communicated (e.g., in accordance with one or more steps of process 1800) even where the web server and/or webpage does not support this functionality. As another example, content may be associated with at least one region of a webpage (e.g., in accordance with one or more steps of process 1800) even where the web server and/or webpage does not support this functionality.

In one embodiment, one or more steps of process 1800 may be performed by at least one component of at least one computer system (e.g., a peer proxy server such as peer proxy server 124 and/or peer proxy server 134, a web browser such as web browser 122 and/or web browser 132, another component of at least one computer system, etc.) participating in a co-browsing session (e.g., established in step 1810). In this manner, content (e.g., at least one communication, at least one image, video, text, sound, etc.) may be associated with at least one region of a webpage during a co-browsing session in one embodiment.

Alternatively, one or more steps of process 1800 may be performed by at least one component of at least one computer system (e.g., a peer proxy server such as peer proxy server 124 and/or peer proxy server 134, a web browser such as web browser 122 and/or web browser 132, another component of at least one computer system, etc.) independent of or otherwise not participating in a co-browsing session. For example, content (e.g., at least one communication, at least one image, video, text, sound, etc.) may be associated with a region of a webpage which is not being contemporaneously co-browsed with at least one other computer system in one embodiment. In this manner, a user may associate content (e.g., at least one communication, at least one image, video, text, sound, etc.) with a region of a webpage for access and/or viewing by at least one other user (e.g., within a social network of the user, designated by the user associating the content with the region, in accordance with access control information 2020, in accordance with access control settings configured in step 2410 of process 2400 and/or accessed in step 2430 of process 2400, etc.)

Although FIG. 18 shows process 1800 with a specific number of steps, it should be appreciated that process 1800 may have a different number of steps in other embodiments. For example, step 1810 and/or step 1880 may be optional and omitted (e.g., where content is associated with at least one region of a webpage independently of or otherwise not during a co-browsing session, etc.) in one embodiment. Additionally, although FIG. 18 shows process 1800 with a specific ordering of steps, it should be appreciated that process 1800 may have a different ordering of steps in other embodiments.

Although FIGS. 19A through 19D depict communication interfaces of webpage 900 with a certain number and arrangement of elements, it should be appreciated that the communication interfaces of webpage 900 may have a different number and/or arrangement of elements in other embodiments. Additionally, although FIGS. 19A through 19D depict elements of communication interfaces of webpage 900 with a certain size and shape, it should be appreciated that elements of the communication interfaces of webpage 900 may be a different size and/or shape in other embodiments.

Figure 22:
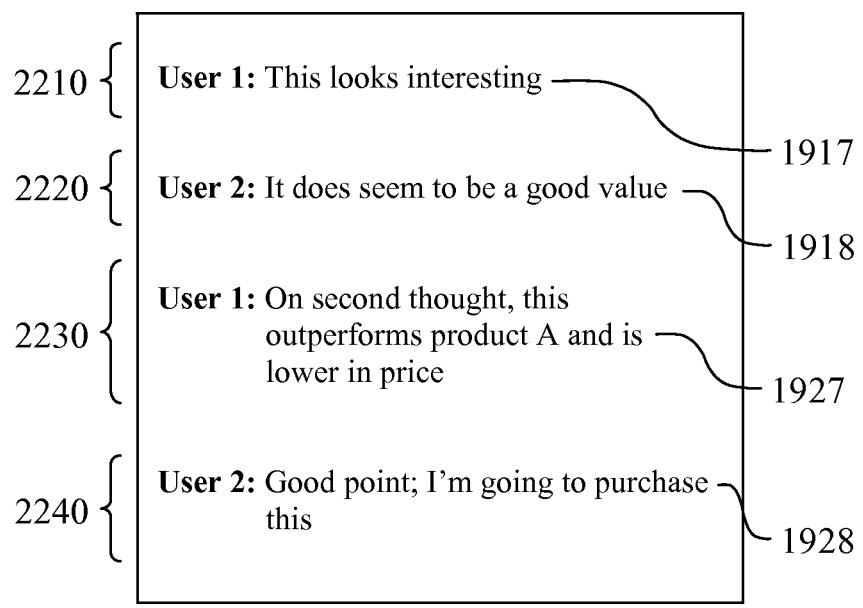
FIG. 22 shows an exemplary on-screen user interface for displaying communications input using a plurality of communication interfaces in accordance with one embodiment of the present invention.

FIG. 22 shows exemplary on-screen user interface 2200 for content submitted using a plurality of communication interfaces in accordance with one embodiment of the present invention. As shown in FIG. 22, user interface 2200 includes a plurality of regions, where each region includes at least one respective portion of content. For example, region 2210 may include communication 1917 (e.g., input using communication interface 1910), region 2220 may include communication 1918 (e.g., input using communication interface 1910), region 2230 may include communication 1927 (e.g., input using communication interface 1920), and region 2240 may include communication 1928 (e.g., input using communication interface 1920).

In one embodiment, interaction with a region of user interface 2200 may cause a communication interface (e.g., associated with and/or used to input the content of the selected region) and/or a region of a webpage associated with the communication interface to be displayed. For example, responsive to an interaction with region 2210 of user interface 2200, communication interface 1910 (e.g., used to input communication 1917 as displayed in region 2210 of user interface 2200) and/or a region associated with communication interface 1910 (e.g., region 932 of webpage 900) may be displayed. In this manner, user interface 2210 may be used to provide context for content by initiating display of at least one region of a webpage associated with the content and/or by initiating display of the content (e.g., within a communication interface) contemporaneously with at least one region of a webpage associated with the content.

In one embodiment, where a display of a region associated with content (e.g., responsive to an interaction with a region of user interface 2200) would cause the display of a webpage within a viewport or window of a web browser to be changed (e.g., where a different webpage is currently being viewed, where a different portion of the same webpage is currently begin viewed, etc.), a message may be displayed to inform the user of the situation and enable the user to proceed with the alteration of the view of and/or navigation away from the currently-displayed webpage. If the user indicates that he or she wishes to proceed, the region associated with the communication may be displayed to provide context for the content.

In one embodiment, user interface may be displayed contemporaneously with at least one communication interface (e.g., used to input and/or display content also displayed in user interface 2200, 1910, 1920, etc.) and/or contemporaneously with a webpage (e.g., used to provide context for content displayed in user interface 2200, 900, 1000, etc.). In one embodiment, user interface 2200 may be displayed using data (e.g., chat data 2010 or a portion thereof) separate from content of the webpage (e.g., stored on or otherwise provided using web server 110), where user interface 2200 may overlap the content of the webpage (e.g., 900). In this case, user interface 2200 may be displayed without modifying the webpage itself (e.g., as provided by web server 110). Additionally, in one embodiment, the data of user interface 2200 and the content of the webpage (e.g., 900) may be stored on separate servers or using separate computer systems, may be owned or managed by separate entities, etc. Alternatively, user interface 2200 may be included within or otherwise displayed using content of the webpage (e.g., the webpage may be modified to accommodate or otherwise include the data of user interface 2200).

Although FIG. 22 depicts user interface 2200 with a certain number and arrangement of elements, it should be appreciated that user interface 2200 may have a different number and/or arrangement of elements in other embodiments. Additionally, although FIG. 22 depicts elements of user interface 2200 with a certain size and shape, it should be appreciated that elements of user interface 2200 may be a different size and/or shape in other embodiments.

Turning back to FIG. 16, user interface 1600 may enable a replaying of a co-browsing session (e.g., alone or in combination with a replaying of a webpage navigation session as discussed with respect to FIG. 16 herein) in accordance with one embodiment of the present invention. For example, region 1610 of user interface 1600 may be used to display content of a co-browsing session (e.g., including at least one communication interface associated with a region of the webpage being co-browsed) being replayed or recalled. In one embodiment, content displayed in region 1610 may be similar or identical to that displayed in the window or viewport of the web browser that was originally used to display the webpage and/or at least one communication interface during the co-browsing session. The content may include one or more frames of data (e.g., the state of webpage 900 as shown in FIG. 19A may be a first frame, the state of webpage 900 as shown in FIG. 19B may be a second frame, the state of webpage 900 as shown in FIG. 19C may be a third frame, the state of webpage 900 as shown in FIG. 19D may be a fourth frame, etc.), where the frames may be replayed in succession to show a video. In this manner, the replay of the co-browsing session may show a sequential display of communication interfaces associated with different regions of the webpage, a sequential display of communications in the communication interfaces, etc., where the replay of the co-browsing session may be accompanied by a replay of the navigation of the webpage (e.g., showing movement of the cursor, entry and/or deletion of information in form fields, selections entered using form fields, etc.) during the co-browsing session.

In one embodiment, data associated with the co-browsing session may be used to generate content for the replay of the co-browsing session. For example, data associated with each time or timestamp (e.g., from the left-most column in data structure 2100) may be used to create a respective frame or image to be displayed during the replay of content. Each frame or image may include content from a webpage identified using a URL (e.g., from the second column from the left of data structure 2100), where the webpage content may be accessed from the web server (e.g., 110) providing the webpage. Each frame or image may include at least one communication interface displayed in accordance with information about the at least one communication interface (e.g., from the rightmost column in data structure 2100). Additionally, each communication interface may be associated with and/or displayed in proximity to a region of the webpage (e.g., from the second column from the right of data structure 2100). Further, in one embodiment, each frame or image may include information about navigation of the webpage (e.g., from data structure 1100).

An interaction with element 1621 may initiate a replay of a co-browsing session in actual time (e.g., an amount of time elapsed in the actual co-browsing session equals or approximately equals the amount of time elapsed in the replay of the co-browsing session). Element 1622 may be used to step forward or fast forward or replay the co-browsing session (e.g., at a faster rate than that initiated using element 1621).

An interaction with element 1623 may initiate a step backward or rewind of the co-browsing session (e.g., in an order which is opposite from that associated with element 1621 and/or 1622). Element 1624 may be used to pause the replay of the co-browsing session. Additionally, an interaction with element 1625 may stop the replay of the co-browsing session.

Figure 23:
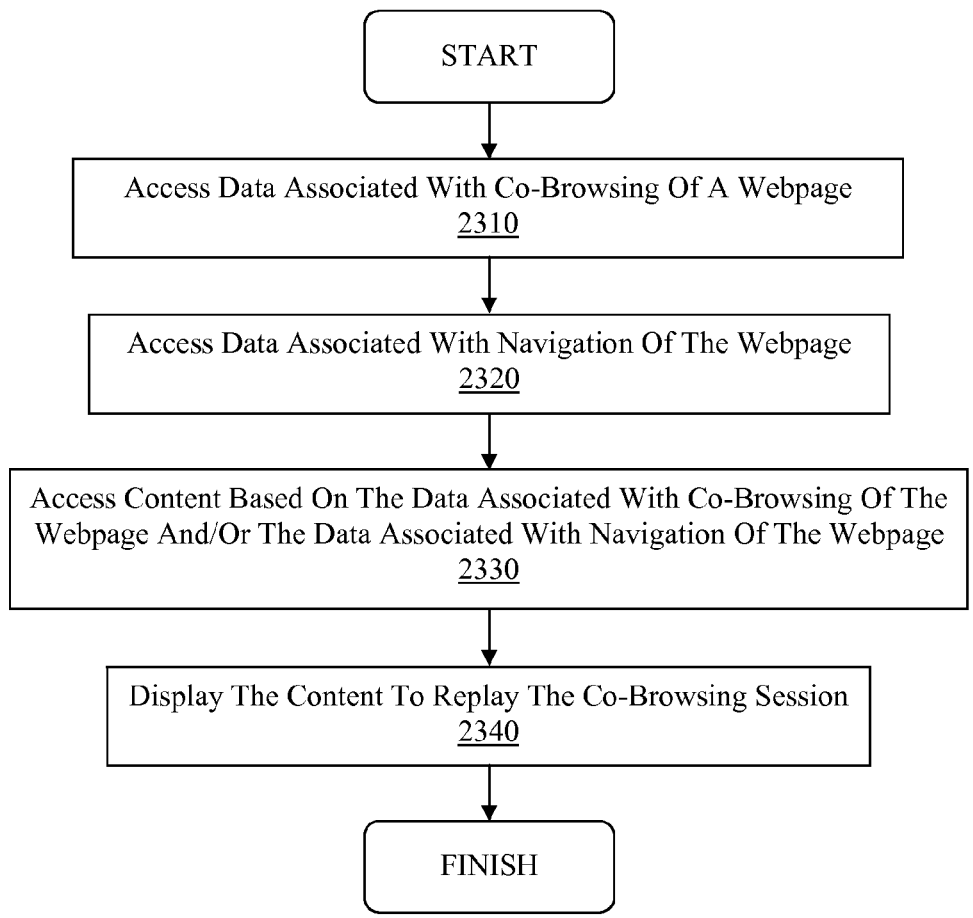
FIG. 23 shows a flowchart of a computer-implemented process for replaying a co-browsing session in accordance with one embodiment of the present invention.

FIG. 23 shows a flowchart of computer-implemented process 2300 for replaying a co-browsing session in accordance with one embodiment of the present invention. As shown in FIG. 23, step 2310 involves accessing data (e.g., stored in data storage 850, similar to data structure 2100, etc.) associated with co-browsing of a webpage (e.g., 900, 1000, another webpage, etc.). The data may include information (e.g., at least one URL, at least one URL-resident argument, at least one region of a webpage, data associated with at least one communication interface and/or content submitted using at least one communication interface, etc.), where each portion of the information may correspond to a respective time or time stamp.

Step 2320 involves accessing data (e.g., stored in data storage 850, similar to data structure 1100, etc.) associated with navigation of a webpage (e.g., 900, 1000, another webpage, etc.). The data may include information (e.g., at least one URL, at least one URL-resident argument, at least one cursor position, at least one state of at least one form field, etc.), where each portion of the information may correspond to a respective time or time stamp.

As shown in FIG. 23, step 2330 involves accessing content based on the data associated with co-browsing of the webpage and/or the data associated with navigation of the webpage. For example, step 2330 may involve accessing and/or generating content (e.g., from data storage 850, from another source, based on data in data structure 2100 such as a URL, etc.) used to render at least one communication interface (e.g., 1910, 1920, etc.), content (e.g., at least one communication, at least one image, video, text, sound, etc.) submitted via at least one communication interface, a user interface such as user interface 2200, other data associated with a co-browsing session, etc. As another example, step 2330 may involve accessing and/or generating content (e.g., from web server 110, from another source, based on data in data structure 1100 such as a URL, etc.) associated with navigation of the webpage, where the content associated with navigation of the webpage may include online content of the webpage being co-browsed, content for rendering a cursor (e.g., displayed at a position determined from the data accessed in step 2320), content for rendering text entered in a form field (e.g., determined from the data accessed in step 2320), content for rendering at least one selection indicated using a form field (e.g., determined from the data accessed in step 2320), some combination thereof, etc. As a further example, step 2330 may involve accessing data indicating a relationship (e.g., which content overlaps the other, etc.) between data associated with the co-browsing session (e.g., at least one communication interface, content submitted via at least one communication interface, a user interface such as user interface 2200, etc.) and data associated with navigation of the webpage (e.g., online content of the webpage itself, a cursor, a form field, information entered in a form field, a selection made using a form field, etc.).

Step 2340 involves displaying the content (e.g., accessed in step 2330) to replay the co-browsing session. In one embodiment, the content may be displayed in step 2340 in a region (e.g., 1610) of a user interface (e.g., 1600). The replay in step 2340 may be in forward order or reverse order. In one embodiment, step 2340 may involve initiating, stopping, pausing, or otherwise altering the display of content based upon an interaction with an element (e.g., 1621, 1622, 1623, 1624, 1625, etc.) of a user interface (e.g., 1600). And in one embodiment, step 2340 may be performed by the same computer system used to perform other steps of process 2300 or a different computer system than that used to perform other steps of process 2300.

In one embodiment, one or more steps of process 2300 may be performed using a plug-in to a web browser (e.g., 122, 132, used to display the content in step 2340, etc.). The plug-in may be persistent and/or stored on the computer system (e.g., 120, 130, etc.) after download (e.g., for future use such that the plug-in need not be re-downloaded to the computer system). And in one embodiment, one or more steps of process 2300 may be performed using an application separate from a web browser (e.g., 122, 132, used to display the content in step 2340, etc.).

Although FIG. 23 shows process 2300 with a specific number of steps, it should be appreciated that process 2300 may have a different number of steps in other embodiments. Additionally, although FIG. 23 shows process 2300 with a specific ordering of steps, it should be appreciated that process 2300 may have a different ordering of steps in other embodiments.

Figure 24:
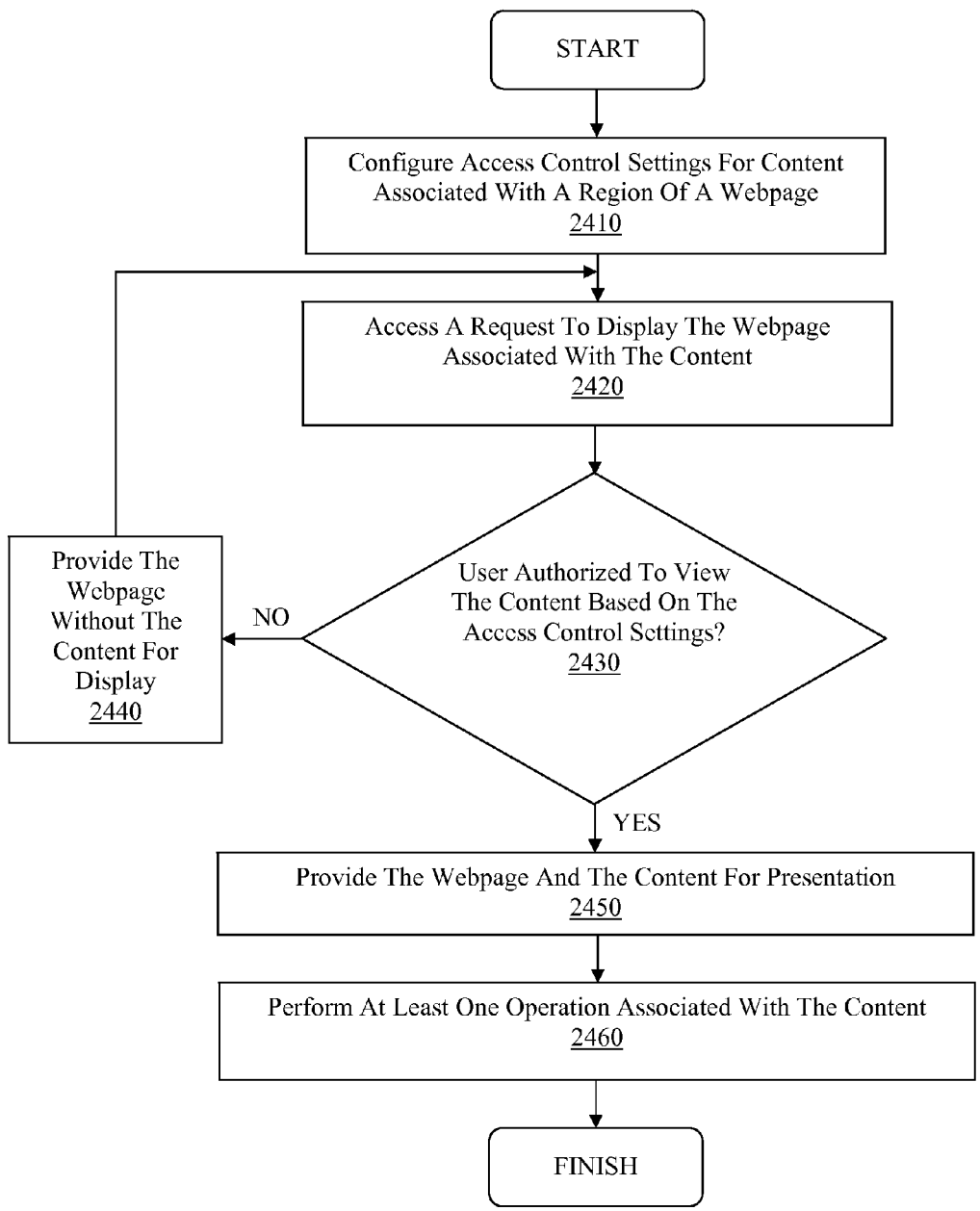
FIG. 24 shows a flowchart of a computer-implemented process for presenting content associated with a webpage in accordance with one embodiment of the present invention.

FIG. 24 shows a flowchart of computer-implemented process 2400 for presenting content associated with a webpage in accordance with one embodiment of the present invention. As shown in FIG. 24, step 2410 involves configuring access control settings for content associated with a region of a webpage (e.g., content that was associated with a region of a webpage in accordance with one or more steps of process 1800). The content may include at least one communication (e.g., 1917, 1918, 1927, 1928, etc.) or other content (e.g., at least one image, video, text, sound, etc.) submitted via at least one communication interface (e.g., 1910, 1920, presented in conjunction with a co-browsing session, presented independently of a co-browsing session, etc.) in one embodiment. Step 2410 may involve storing and/or modifying data (e.g., access control information 2020 of data storage 850 as shown in FIG. 20) associated with controlling access to the content. In one embodiment, step 2410 may involve selecting one or more users (e.g., at least one friend, at least one member of a group or organization, all members of a group or organization, at least one user who visits a webpage associated with the at least one communication, at least one participant in the co-browsing session, at least one user other than the participants in the co-browsing session, etc.) who can view the content contemporaneously with display of the webpage (e.g., during a browsing session of the webpage after a browsing session and/or co-browsing session in which the content was submitted).

Step 2420 involves accessing a request to display the webpage associated with the content (e.g., that was associated with a region of the webpage). In one embodiment, the request accessed in step 2420 may be a request to a web server (e.g., 110) that provides or hosts the webpage. The request may be initiated using a web browser (e.g., 122, 132, etc.) which is subsequently used (e.g., in step 2450) to display the webpage in one embodiment. The request may be initiated by or otherwise associated with a participant in the co-browsing session or by a user that did not participate in the co-browsing session in one embodiment. And in one embodiment, the request may be initiated subsequently to a browsing session and/or co-browsing session of the webpage (e.g., in which the content is submitted).

As shown in FIG. 24, step 2430 involves determining whether a user (e.g., associated with the request of step 2420) is authorized to view the content based on the access control settings (e.g., configured in step 2410). In one embodiment, step 2430 may involve indexing access control information 2020 to determine if the user is authorized to view the content. If the user is not authorized to view the content, then the webpage may be provided (e.g., from web server 110) without the content for display (e.g., using a web browser such as web browser 122, web browser 132, etc.) in step 2440. In this manner, the user may browse the webpage without seeing the content (e.g., associated with a region of the webpage) which the user is not authorized to view.

Alternatively, if the user is authorized to view the at least one communication, then the webpage and the content may be provided for presentation (e.g., using a web browser such as web browser 122, web browser 132, using an output device, using communication interface 2570, etc.) in step 2450. In one embodiment, step 2450 may involve providing the webpage and the content from the same system (e.g., web server 110). Alternatively, step 2450 may involve providing the webpage and the content from different systems (e.g., the webpage from web server 110 and the content from another system such as computer system 120, computer system 130, another system, etc.). In this manner, the user may browse the webpage in conjunction with the content (e.g., as shown in FIGS. 19A through 19D, etc.), where the content (e.g., associated with a region of the webpage) may be displayed contemporaneously with the webpage.

Thus, embodiments of the present invention enable visitors of a webpage to access and/or view content (e.g., at least one communication at least one image, video, text, sound, etc.) which was associated (e.g., using at least one communication interface) with one or more regions of the webpage by another user (e.g., during a browsing session, a previous co-browsing session, etc.). It should be appreciated that the content (e.g., submitted using the at least one communication interface) may be overlaid and/or displayed contemporaneously with the webpage, where the content may be provided in step 2450 as part of the webpage and/or separately from content of the webpage. Additionally, embodiments of the present invention enable users (e.g., who create and/or submit the content, participate in the co-browsing session, etc.) to restrict access to the content for viewing by only a particular user or group of users (e.g., determined based on access control information 2020). In one embodiment, the content may include a subset of the content submitted during a browsing session and/or co-browsing session, and therefore, process 2400 may be used to filter content for viewing by one or more other users.

As shown in FIG. 24, step 2460 involves performing at least one operation associated with the content (e.g., displayed in step 2450). In one embodiment, step 2460 may involve filtering the content presented in conjunction with the webpage. For example, a visitor to a webpage (e.g., who is not the author of the content, who is not a participant in the browsing session and/or co-browsing session which resulted in generation of the content, etc.) may initiate the filtering of content (e.g., based upon the author of the content, based upon text or other information within the content, based upon a user preference such as a request to display all content or no content, etc.) presented (e.g., using a web browser such as web browser 122, web browser 132, using an output device, using communication interface 2570, etc.) in conjunction with the webpage.

In one embodiment, step 2460 may involve enabling a user to rate the content (e.g., presented in step 2450). For example, a user may rate a communication or other content associated with a region of the webpage, where the rating may be expressed as a thumbs up, thumbs down, numerical rating (e.g., 4 of 5 stars), etc.

In one embodiment, step 2460 may involve informing a first user (e.g., the author of the content, a participant in the browsing session and/or co-browsing session which resulted in generation of the content, etc.) of the accessing of the content by another user (e.g., a visitor to the webpage after the browsing session and/or co-browsing session has ended). For example, the author of the content (e.g., a participant in the browsing session and/or co-browsing session which resulted in submission of the content) may be informed (e.g., automatically via email, etc.) that another user has accessed the content, rated the content, etc. In this manner, feedback may be provided about content (e.g., submitted during a browsing session and/or co-browsing session) that is subsequently accessed by another user (e.g., responsive to a contemporaneous presentation of the content and the webpage).

In one embodiment, one or more steps of process 2400 may be performed using a plug-in to a web browser (e.g., 122, 132, used to display the content in step 2340, etc.). The plug-in may be persistent and/or stored on the computer system (e.g., 120, 130, etc.) after download (e.g., for future use such that the plug-in need not be re-downloaded to the computer system). And in one embodiment, one or more steps of process 2400 may be performed using an application separate from a web browser (e.g., 122, 132, used to display the content in step 2340, etc.).

In one embodiment, one or more steps of process 2400 may be performed independently of the web server (e.g., 110, hosting and/or providing the webpage associated with a communication interface, etc.). For example, access to content may be controlled and/or content may be accessed (e.g., in accordance with one or more steps of process 2400) even where the web server and/or webpage does not support this functionality. As another example, at least one operation associated with the content may be performed (e.g., in accordance with step 2460) even where the web server and/or webpage does not support this functionality.

Although FIG. 24 shows process 2400 with a specific number of steps, it should be appreciated that process 2400 may have a different number of steps in other embodiments. Additionally, although FIG. 24 shows process 2400 with a specific ordering of steps, it should be appreciated that process 2400 may have a different ordering of steps in other embodiments.

Computer System Platform

Figure 25:
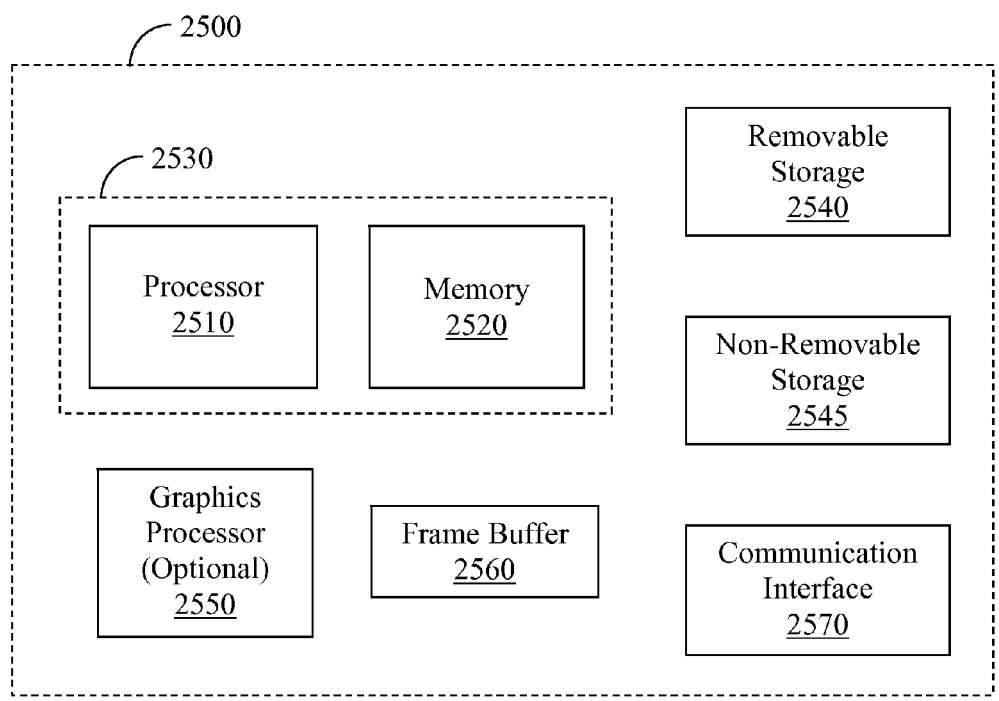
FIG. 25 shows an exemplary general purpose computer system platform upon which embodiments of the present invention may be implemented.

FIG. 25 shows exemplary computer system platform 2500 upon which embodiments of the present invention may be implemented. As shown in FIG. 25, portions of the present invention may be implemented by execution of computer-readable instructions or computer-executable instructions that may reside in components of computer system platform 2500 and which may be used as a part of a general purpose computer network. It is appreciated that computer system platform 2500 of FIG. 25 is merely exemplary. As such, the present invention can operate within a number of different systems including, but not limited to, general-purpose computer systems, embedded computer systems, laptop computer systems, hand-held computer systems, portable computer systems, or stand-alone computer systems.

In one embodiment, computer system platform 2500 may be used to implement web server 110, computer system 120, computer system 130, computer system 440, computer system 550, some combination thereof, etc. And in one embodiment, one or more components of computer system platform 2500 may be disposed in and/or coupled with a housing or enclosure.

In one embodiment, depicted by dashed lines 2530, computer system platform 2500 may include at least one processor 2510 and at least one memory 2520. Processor 2510 may include a central processing unit (CPU) or other type of processor. Depending on the configuration and/or type of computer system environment, memory 2520 may include volatile memory (e.g., RAM), non-volatile memory (e.g., ROM, flash memory, etc.), or some combination of the two. Additionally, memory 2520 may be removable, non-removable, etc.

In other embodiments, computer system platform 2500 may include additional storage (e.g., removable storage 2540, non-removable storage 2545, etc.). Removable storage 2540 and/or non-removable storage 2545 may include volatile memory, non-volatile memory, or any combination thereof. Additionally, removable storage 2540 and/or non-removable storage 2545 may include CD-ROM, digital versatile disks (DVD) or other optical storage, magnetic cassettes, magnetic tape, magnetic disk storage or other magnetic storage devices, or any other medium which can be used to store information for access by computer system platform 2500.

As shown in FIG. 25, computer system platform 2500 may communicate with other systems, components, or devices via communication interface 2570. Communication interface 2570 may embody computer-readable instructions, data structures, program modules or other data in a modulated data signal (e.g., a carrier wave) or other transport mechanism. By way of example, and not limitation, communication interface 2570 may couple to wired media (e.g., a wired network, direct-wired connection, etc.) and/or wireless media (e.g., a wireless network, a wireless connection utilizing acoustic, RF, infrared, or other wireless signaling, etc.).

Communication interface 2570 may also couple computer system platform 2500 to one or more input devices (e.g., a keyboard, a mouse, a trackball, a joystick, a pen, a voice input device, a touch input device, etc.). In one embodiment, communication interface 2570 may couple computer system platform 2500 to one or more output devices (e.g., a display, a speaker, a printer, etc.).

As shown in FIG. 25, graphics processor 2550 may perform graphics processing operations on graphical data stored in frame buffer 2560 or another memory (e.g., 2520, 2540, 2545, etc.) of computer system platform 2500. Graphical data stored in frame buffer 2560 may be accessed, processed, and/or modified by components (e.g., graphics processor 2550, processor 2510, etc.) of computer system platform 2500 and/or components of other systems/devices. Additionally, the graphical data may be accessed (e.g., by graphics processor 2550) and displayed on an output device coupled to computer system platform 2500. Accordingly, memory 2520, removable storage 2540, non-removable storage 2545, fame buffer 2560, or a combination thereof, may be a computer-readable medium or computer-usable medium and may include instructions that when executed by a processor (e.g., 2510, 2550, etc.) implement a method of co-browsing online content (e.g., in accordance with process 600 of FIGS. 6A, 6B and 6C), analyzing navigation of a webpage (e.g., in accordance with process 700 of FIG. 7), replaying a webpage navigation session (e.g., in accordance with process 700 of FIG. 17), enabling communication associated with a webpage (e.g., in accordance with process 1800 of FIG. 18), replaying a co-browsing session (e.g., in accordance with process 2300 of FIG. 23), presenting content associated with a webpage (e.g., in accordance with process 2400 of FIG. 24), some combination thereof, etc.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A computer-implemented method of analyzing navigation of a webpage, said method comprising:
monitoring data associated with navigation of said webpage operable to be displayed using a web browser, wherein said monitoring is performed using a component operable on a computer system executing said web browser;
analyzing said data using said component to determine other data associated with navigation of said webpage, wherein said analyzing further comprises applying at least one rule to said data to determine said other data;
determining a cursor navigation behavior; and
performing at least one operation based on said other data, wherein said at least one operation comprises altering a display of said webpage on said web browser based on said cursor navigation behavior, and wherein the altering the display of said webpage on said web browser is performed by said component,
wherein said data is associated with at least one user interaction that does not initiate a communication with a web server providing said web page,
wherein said monitoring further comprises storing data associated with navigation of said webpage at a plurality of times, and wherein said analyzing further comprises determining said at least one operation based on said navigation of said webpage at said plurality of times.

2. The method of claim 1, wherein said at least one operation further comprises and is selected from a group consisting of rearranging, using said component, a piece of content of said webpage, sending an electronic mail message to a user of said web browser, and initiating a telephone communication with a user of said web browser.

3. The method of claim 1, wherein said data is selected from a group consisting of a position of a cursor and a state of a form field of said webpage.

4. The method of claim 3, wherein said state of said form field is selected from a group consisting of at least one character entered in a text box, at least one character entered in a text area box, at least one item selected using a drop-down list box, a checked state of a radio button, an unchecked state of a radio button, a checked state of a checkbox, and an unchecked state of a checkbox.

5. The method of claim 1, wherein said performing at least one operation further comprises and is selected from a group consisting of initiating a co-browsing session, sending an electronic mail message to a user, initiating a telephone communication with a user, initiating a chat session with a user, displaying a suggestion associated with a product, overlapping said webpage with other content, and modifying said webpage.

6. The method of claim 1, wherein said component comprises a plug-in to said web browser.

7. A non-transitory computer-readable medium having computer-readable program code embodied therein for causing a computer system to perform a method of analyzing navigation of a webpage, said method comprising:
monitoring data associated with navigation of said webpage displayed using a web browser operated by said computer system, wherein said monitoring is performed using a component running on said computer system;
analyzing said data using said component to determine a characteristic of cursor behavior associated with navigation of said webpage, wherein said analyzing further comprises applying at least one rule to said data to determine said characteristic of cursor behavior;
determining a cursor navigation behavior; and
performing at least one operation based on said characteristic of cursor behavior, wherein said at least one operation comprises altering a display of said webpage on said web browser based on said cursor navigation behavior, and wherein the altering the display of said webpage on said web browser is performed by said component,
wherein said data is associated with at least one user interaction that does not initiate a communication with a web server providing said web page,
wherein said monitoring further comprises storing data associated with navigation of said webpage at a plurality of times, and wherein said analyzing further comprises determining said at least one operation based on said navigation of said webpage at said plurality of times.

8. The computer-readable medium of claim 7, wherein said at least one operation further comprises and is selected from a group consisting of rearranging, using said component, a piece of content of said webpage, sending an electronic mail message to a user of said web browser, and initiating a telephone communication with a user of said web browser.

9. The computer-readable medium of claim 7, wherein said data is selected from a group consisting of a position of a cursor and a state of a form field of said webpage.

10. The computer-readable medium of claim 9, wherein said state of said form field is selected from a group consisting of at least one character entered in a text box, at least one character entered in a text area box, at least one item selected using a drop-down list box, a checked state of a radio button, an unchecked state of a radio button, a checked state of a checkbox, and an unchecked state of a checkbox.

11. The computer-readable medium of claim 7, wherein said performing at least one operation further comprises and is selected from a group consisting of initiating a co-browsing session, sending an electronic mail message to a user, initiating a telephone communication with a user, initiating a chat session with a user, displaying a suggestion associated with a product, overlapping said webpage with other content, and modifying said webpage.

12. The computer-readable medium of claim 7, wherein said component comprises a plug-in to said web browser.

13. A system comprising a processor and a memory, wherein said memory comprises instructions that when executed by said system implement a method of analyzing navigation of a webpage, said method comprising:
monitoring data associated with navigation of said webpage displayed using a web browser operated by said system, wherein said monitoring is performed using a component running on said processor of said system;

analyzing said data using said component to determine other data associated with navigation of said webpage, wherein said analyzing further comprises applying at least one rule to said data to determine said other data;

determining a cursor navigation behavior; and performing at least one operation based on said other data, wherein said at least one operation comprises altering a display of said webpage on said web browser based on said cursor navigation behavior, and wherein the altering the display of said webpage on said web browser is performed by said component, wherein said data is associated with at least one user interaction that does not initiate a communication with a web server providing said web page, wherein said monitoring further comprises storing data associated with navigation of said webpage at a plurality of times, and wherein said analyzing further comprises determining said at least one operation based on said navigation of said webpage at said plurality of times.

14. The system of claim 13, wherein said at least one operation further comprises and is selected from a group consisting of rearranging, using said component, a piece of content of said webpage, sending an electronic mail message to a user of said web browser, and initiating a telephone communication with a user of said web browser.

15. The system of claim 13, wherein said data is selected from a group consisting of a position of a cursor and a state of a form field of said webpage.

16. The system of claim 15, wherein said state of said form field is selected from a group consisting of at least one character entered in a text box, at least one character entered in a text area box, at least one item selected using a dropdown list box, a checked state of a radio button, an unchecked state of a radio button, a checked state of a checkbox, and an unchecked state of a checkbox.

17. The system of claim 13, wherein said performing at least one operation further comprises and is selected from a group consisting of initiating a co-browsing session, sending an electronic mail message to a user, initiating a telephone communication with a user, initiating a chat session with a user, displaying a suggestion associated with a product, overlapping said webpage with other content, and modifying said webpage.

18. The system of claim 13, wherein said component comprises a plug-in to said web browser.

* * * * *